United States Patent [19]

Witzman et al.

[11] Patent Number: 5,737,399
[45] Date of Patent: Apr. 7, 1998

[54] NETWORK INFORMATION ARCHITECTURE HAVING CENTRALIZING STORAGE AND VERIFICATION ELEMENT

[75] Inventors: Kevin R. Witzman, Monument; Isaac K. Elliott, Colorado Springs; Robert A. Smout, Divide; Arlene M. Plaza; Richard A. Sostheim, both of Colorado Springs, all of Colo.

[73] Assignee: MCI Communications Corporation, Washington, D.C.

[21] Appl. No.: 438,931

[22] Filed: Jul. 13, 1995

[51] Int. Cl.[6] .......................... H04M 15/00; H04M 3/42; H04M 7/00
[52] U.S. Cl. .................. 379/112; 379/113; 379/133; 379/207; 379/220
[58] Field of Search ................ 379/1.13–16, 36, 379/111–115, 131–135, 28, 207, 219, 220; 371/32

[56] References Cited

U.S. PATENT DOCUMENTS

| | | |
|---|---|---|
| 4,456,788 | 6/1984 | Kline et al. . |
| 4,464,543 | 8/1984 | Kline ............................ 379/135 |
| 4,498,186 | 2/1985 | Hwang .......................... 379/28 |
| 4,737,950 | 4/1988 | Fechalos . |
| 4,788,718 | 11/1988 | McNabb ........................ 379/115 |
| 4,876,717 | 10/1989 | Barron et al. . |
| 4,878,240 | 10/1989 | Lin et al. . |
| 4,977,582 | 12/1990 | Nichols et al. . |
| 5,003,584 | 3/1991 | Benyacar ....................... 379/135 |
| 5,062,040 | 10/1991 | Bishop et al. . |
| 5,062,103 | 10/1991 | Davidson et al. . |
| 5,153,907 | 10/1992 | Pugh et al. . |
| 5,159,698 | 10/1992 | Harrington .................... 379/112 |
| 5,187,710 | 2/1993 | Chau et al. . |
| 5,193,110 | 3/1993 | Jones et al. . |
| 5,271,058 | 12/1993 | Andrews et al. . |
| 5,311,576 | 5/1994 | Brunson et al. . |
| 5,329,579 | 7/1994 | Brunson . |
| 5,333,183 | 7/1994 | Herbert . |
| 5,359,646 | 10/1994 | Johnson et al. . |
| 5,384,840 | 1/1995 | Blatchford et al. . |
| 5,418,844 | 5/1995 | Morrisey ....................... 379/112 |
| 5,432,845 | 7/1995 | Burd ............................ 379/207 |
| 5,506,893 | 4/1996 | Buscher ........................ 379/114 |
| 5,517,555 | 5/1996 | Amadon ....................... 379/114 |

*Primary Examiner*—Curtis Kuntz
*Assistant Examiner*—Vijay Shankar

[57] ABSTRACT

Telephone network switches and other network elements are connected to the inputs of respective storage and verification elements (SAVE) which are a distinct improvement over prior art adjunct processors. The SAVE cooperates with a network information concentrator so as to provide raw data that is filtered of extraneous data so as to be useful as raw (filtered) data for downstream clients. The network information architecture described herein also operates upon input network event data to achieve event matching and database enhancement of the network event data. The end result is matched or enhanced data for downstream clients, when required. The network information architecture further cooperates with a generalized statistics engine for summarizing network event statistics or preselected types of calls, such as 800 or 900 number calls. These statistics become available, when desired, for downstream clients. The generalized statistics engine also provides alarm data, derived from statistics, for downstream clients.

8 Claims, 23 Drawing Sheets

COUNT REGISTRY 94

NUMBER CALLED-(800) 254-6575
SERVICE-TOTALS SUMMARY

| STATISTIC | COUNT |
|---|---|
| ATTEMPTED | 2 |
| COMPLETED | 1 |
| • | |
| • | |

COUNT GROUP 90

NUMBER CALLED-(800) 254-6575
SERVICE-AREA CODE (NPA)

| STATISTIC | COUNT |
|---|---|
| ATTEMPTED | 1 |
| COMPLETED | 0 |
| • | |
| • | |
| • | |
| • | |

COUNT GROUP 92

*FIG. 9*

GLOSSARY OF ABBREVIATIONS

| | |
|---|---|
| ABF | ADF BLOCK FORMATTER |
| ABS | ADF BLOCK STORAGE MANAGER |
| ADF | APPLICATION DATA FIELD |
| AP | ADJUNCT PROCESSOR |
| API | APPLICATION PROGRAMMING INTERFACE |
| ARP | ADF RECORD PROCESSOR |
| BDR | BILLING DATA RECORD |
| BSN | BLOCK SEQUENCE NUMBER |
| CDR | CALL DETAIL RECORD |
| CR | CENTRAL RETRANSMITTER |
| DAP | DATA ACCESS POINT |
| DBMS | DATABASE MANAGEMENT SYSTEM |
| DCM | DTS COMMUNICATION MANAGER |
| DTS | DAP TRAFFIC STATISTICS |
| E/P/EP | EXTENDED/PRIVATE/EXTENDED PRIVATE |
| FMS | FRAUD MANAGEMENT SYSTEM |
| GSL | GENERALIZED STATISTICS LIBRARY |
| IPC | INTER-PROCESS COMMUNICATION |
| ISP | INTELLIGENT SERVICES PLATFORM |
| LSE | LOCAL SUPPORT ELEMENT |
| MOSR | MATCHED OPERATOR SERVICE RECORD |
| NER | NIC EVENT RECORD |
| NIA | NETWORK INFORMATION ARCHITECTURE |
| NIC | NETWORK INFORMATION CONCENTRATOR |
| OS LEVEL | OPERATOR SERVICE LEVEL |
| OSR | OPERATOR SERVICE RECORD |
| RRM | RETRANSMISSION REQUEST MANAGER |
| SAM | SYSTEM ADMINISTRATION AND MAINTENANCE |
| SAVE | STORAGE AND VERIFICATION ELEMENT |
| SDI | SAVE-TO-DAP INTERFACE |
| SER | SWITCH EVENT RECORD |
| SLI | SAVE-TO-LSE INTERFACE |
| SNI | SAVE-TO-NIC INTERFACE |
| SRS | SECURITY ROUTING SERVICES |
| TCP/IP | TRANSMISSION CONTROL PROTOCOL/INTERNET PROTOCOL |
| TLM | TRANSMISSION LINK MONITOR |
| UI | USER INTERFACE |
| VOS | VIRTUAL OPERATING SYSTEM |

*FIG. 20*

NETWORK INFORMATION ARCHITECTURE HAVING CENTRALIZING STORAGE AND VERIFICATION ELEMENT

RELATED APPLICATION

The present application relates to co-pending applications: Ser. No. 08/438,926, filed May 10, 1995 entitled "Generalized Statistics Engine for Telephone Network Employing a Network Element Concentrator"; Serial No. 08/426,256, filed Apr. 21, 1995 filed entitled "Network Information Concentrator"; and Ser. No. 08/438,914, filed May 10, 1995, entitled "A Method for Acquiring Statistics in a Telephone Network Employing Flexibly Changeable Rules".

FIELD OF THE INVENTION

The present invention relates to phone networks, and more particularly to improved architecture for collecting call event records from various network switches and network elements.

BACKGROUND OF THE INVENTION

FIG. 1 is a generalized prior art elementary telecommunications network showing the path between a call originating point, for example, origination phone 6, and the network such as the MCI network, which will be the assumed network for this disclosure. Typically, a call from an origination phone 6 is handled by a local exchange carrier LEC 8. If, for example, an 800 toll-free number is dialed by the origination phone 6, the LEC 8 recognizes that MCI is the carrier for this particular 800 number. Consequently, the call is routed via line 9 to the MCI origination switch 10. This is the entry point of the call into the MCI network, and further routing may be necessary. However, in order to simplify the discussion of the present invention, simply routing through the switch 10 is presumed. Typically, switches of the type discussed are well-known in the art and identified, by way of example, as a DEX 600E switch, manufactured by Digital Switch Corporation, or alternatively a DMS 250 manufactured by Northern Telecom Corporation. International switches are provided by Ericcson Limited. The switch 10 has an adjunct processor (AP) 14 associated with it. The purpose of the adjunct processor is to receive call detail records (CDR) from the switch and collect them in buffers. Adjunct Processors are of the type manufactured by Stratus, once marketed by IBM, and identified as a System 88 processor. This system later became the Stratus XA 2000. Each switch in the network, such as switch 11, has an adjunct processor associated with it.

The call detail records are employed by various applications running in the network. For example, cloned data is provided along line 16 to a billing application 18 which posts the normal billing information for calls made by customers. Additional conventional applications include the acquisition of traffic statistics 24, as well as network management 28. Each of these applications utilizes specific data fields within the CDR data cloned by the involved adjunct processor 14. As will be appreciated, in a complicated network, each adjunct processor must communicate with each application so that the number of outputs from each AP, as well as the total number of inputs to the various applications, becomes unwieldy and difficult to manage from a hardware and software point of view.

Users of the various applications 18, 24 and 28 are schematically indicated by box 22. These may be databases of the MCI network or databases of customers who selectively load data from one or more applications. For example, a large corporate customer (user) may wish to monitor statistics regarding toll-free 800 number calls for which it is being billed. The traffic statistics application 24 includes such data for the customer which is extracted from the call detail records (CDR) provided by the various adjunct processors in the system.

The conventional data access point (DAP) 32 controls the routing of calls between network switches. The DAP also may block a call if it is unauthorized, or if network conditions warrant such blocking. The DAP is basically a large processor based database that includes customer profile information. The DAP stores call origination information, including such data as origination phone number, time of day a call was made, etc.

BRIEF DESCRIPTION OF THE PRESENT INVENTION

The novelty of the present invention is its ability to (1) collect network event information into a logically centralized location; (2) match records of a single call from switches or other intelligent network elements at a single point; (3) enhance raw or matched records for network events with information from network databases; (4) derive statistical and alarm data from the raw, matched or enhanced network event information; and (5) deliver any or all of the above information to a downstream client computing system.

The present invention includes a Storage And Verification Element (SAVE) that is connected at its input to each switch or network element for collecting network event information into a logically centralized location. Further, there is included network information concentrator (NIC) which has its inputs connected to the outputs of each SAVE. One primary objective of the NIC is to match records of a single call from various switches or other intelligent network elements. It can also enhance raw or matched records for network elements with information derived from network databases. A Generalized Statistics Engine (GSE) receives inputs from the NIC and serves to generate statistical and alarm data from the network event information. Switches at other network elements, such as the DAP, are connected to the inputs of a respective SAVE. The NIC compresses data and filters it, thus providing only the type of data required by a specific application. Thus, the billing application previously mentioned would receive only call record data pertaining to the billing function. The NIC of the present invention incorporates a match/merge subsystem which provides the ability to match/merge call record files originated by different network elements, but relating to the same call. In essence, the NIC provides a single point for the call record data from the various network elements thereby facilitating the match/merge function.

The present network information architecture, shown in FIG. 2A, includes a network information concentrator (NIC) that has its inputs connected to the outputs of each SAVE. The NIC is the subject matter of the above identified related application. Switches and other network elements, such as the DAP, are connected to the inputs of a respective SAVE. The NIC compresses data and filters it, thus providing only the type of data required by a specific application. Thus, the billing application previously mentioned would receive only call record data pertaining to the billing function. The end result is to replace the adjunct processors and their multiple outputs; and to increase the number of inputs that can be handled by the architecture, thereby substantially increasing the number of possible applications which may be run from call records.

The architecture is specifically designed to collect call event records being originated by various switches and network elements. The first process is to merge records as necessary into single enhanced records with the addition of a set of controls to capture any data gaps or duplicate data, as well as generating retransmission of data from adjunct processors in the event that gaps or duplicates are detected. The result is assurance of data integrity as early in the call record process as possible.

The GSE receives call event information from the NIC and produces counts of network events in many categories, and delivers those counts to client systems on regular intervals. The GSE also derives alarm information from the network event information, and delivers those to client systems as they occur.

BRIEF DESCRIPTION OF THE FIGURES

The above-mentioned objects and advantages of the present invention will be more clearly understood when considered in conjunction with the accompanying drawings, in which:

FIG. 9 is a schematic illustration of a Count Registry for storing statistic counts in accordance with the present invention.

FIG. 20 is a glossary of abbreviations included in the following description of the invention.

Figure 1:
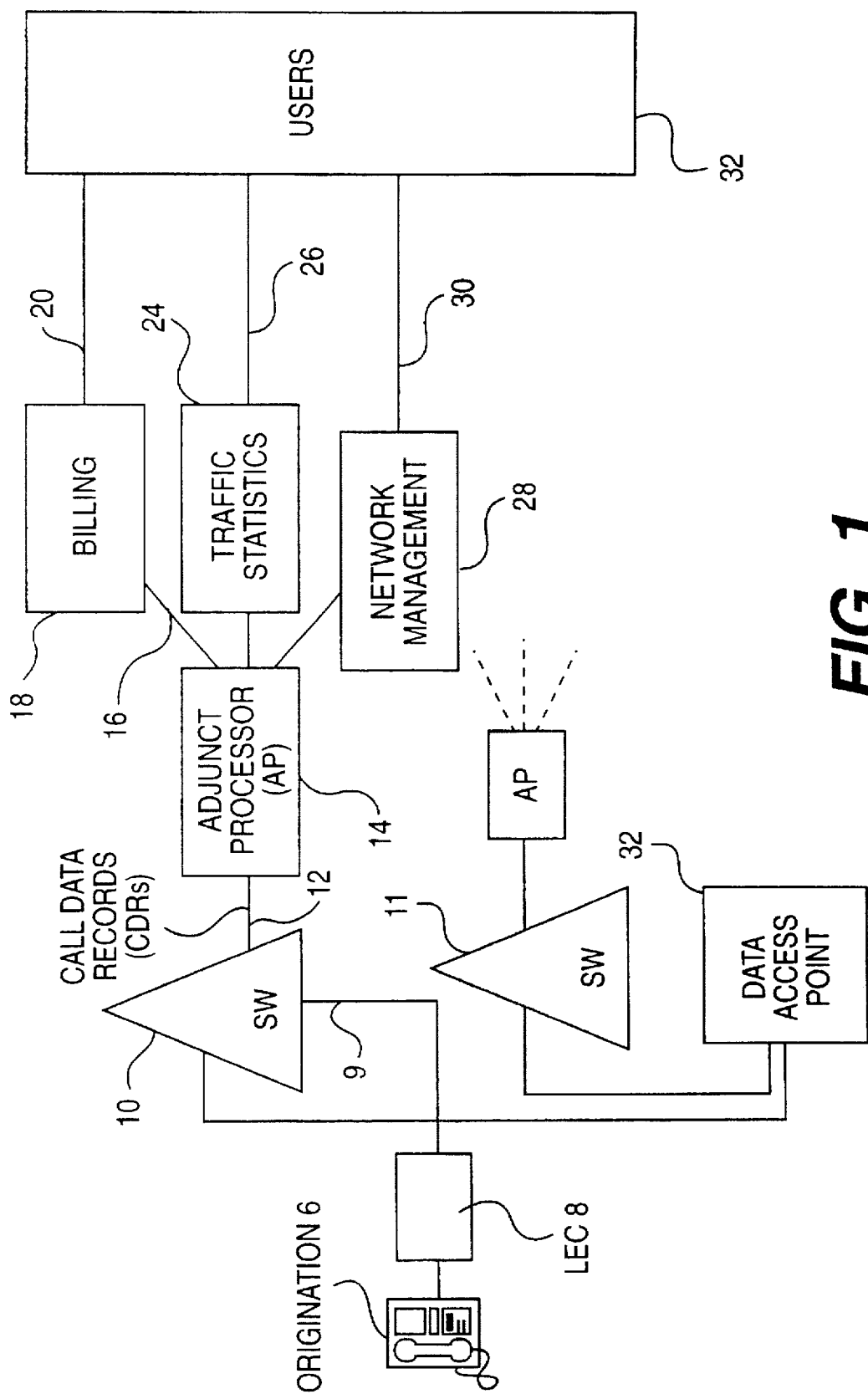
FIG. 1 is a block diagram of prior art network information architecture indicating the connections between an adjunct processor and various data applications.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

DETAILED DESCRIPTION OF THE INVENTION

It is pointed out that FIG. 20 is a glossary of abbreviations used in this description.

Figure 2A:
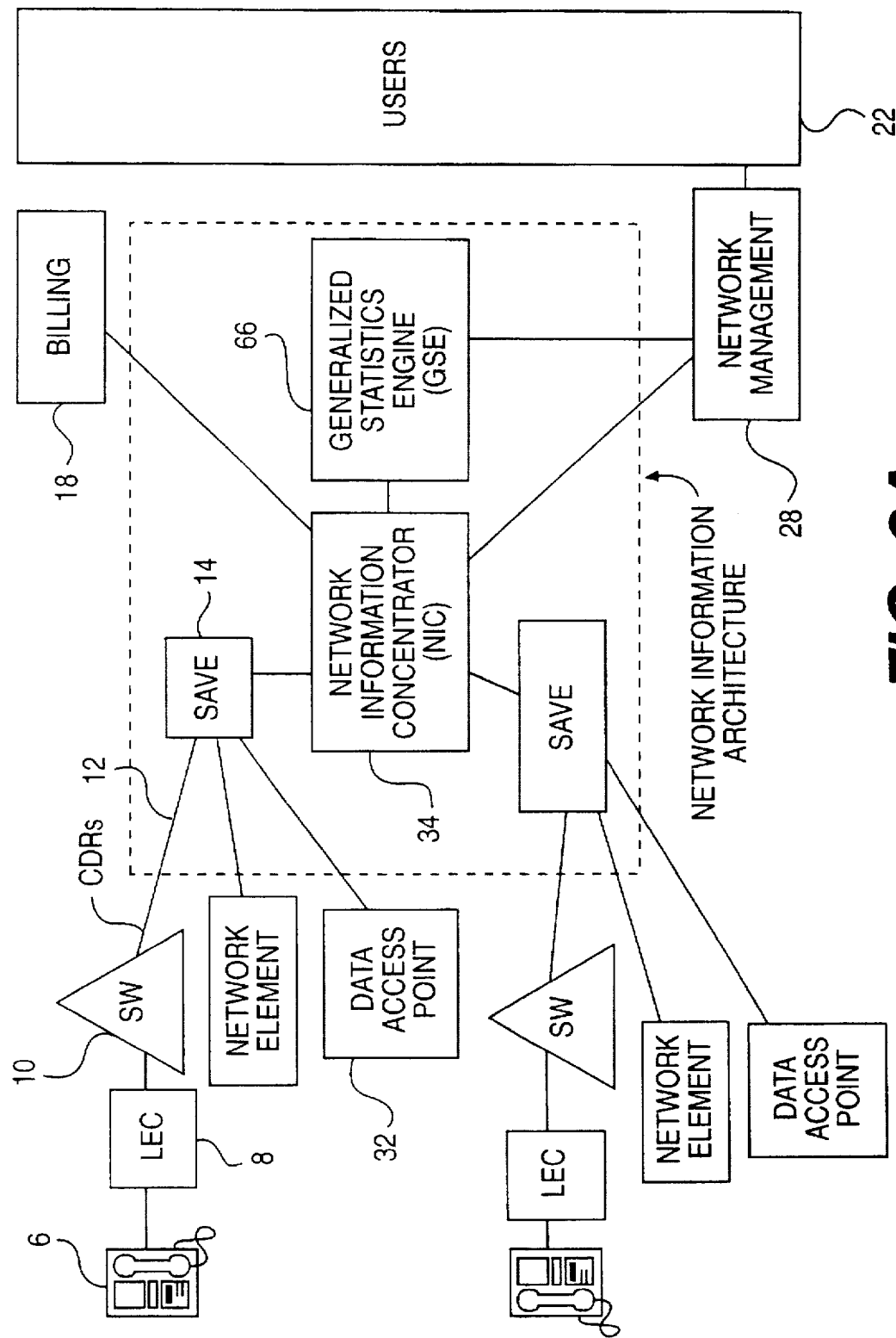
FIG. 2A is a block diagram of the present invention indicating the inclusion of a network information concentrator between SAVEs and data applications.

FIG. 2A illustrates the network information architecture which constitutes an improvement of the previously discussed prior art. However, as in the case of the prior art, an originating point, for example phone 6, communicates via a local exchange carrier LEC 8 to the network. As in the prior art, if an 800 toll-free number is dialed by the origination phone 6, the LEC 8 recognizes the network to handle the call, for example, MCI. As a result, the call is routed to an MCI origination switch 10. This is the entry point of the call into the MCI system, and further routing is normally required. As in the case of the prior art, a data access point 32 provides this function. In fact, a number of switches and other network elements feed data (12) to a corresponding Storage and Verification Element (SAVE) 14 which stores and distributes the data (33) to the network information concentrator 34 (NIC), as discussed hereinafter. Other types of network elements may include an enhanced voice services platform or an intelligent services network platform. The lager subject is discussed in an article by Richard Robrock entitled "The Intelligent Network—Changing the Face of Communications" published in the *Proceedings of the I.E.E.E.*, Vol. 79, No. 1, January 1991.

The output of each SAVE 14 is connected to an input of a distributed group of processors constituting the network information concentrator. The purpose of the concentrator is to compress and filter data supplied thereto, on an applications basis. By that it is meant that the concentrator 34 selects certain types of data fields from all of the data supplied to it, as required by a particular application (e.g., billing 18), which may then be employed by a user (22) (customer). As will be observed from FIG. 2A, a single point of access to the applications is provided to transfer data from all network elements served. For the most part, the data format for the various applications is uniform so that the NIC 34 deals with standardized communications for the applications.

Figure 2B:
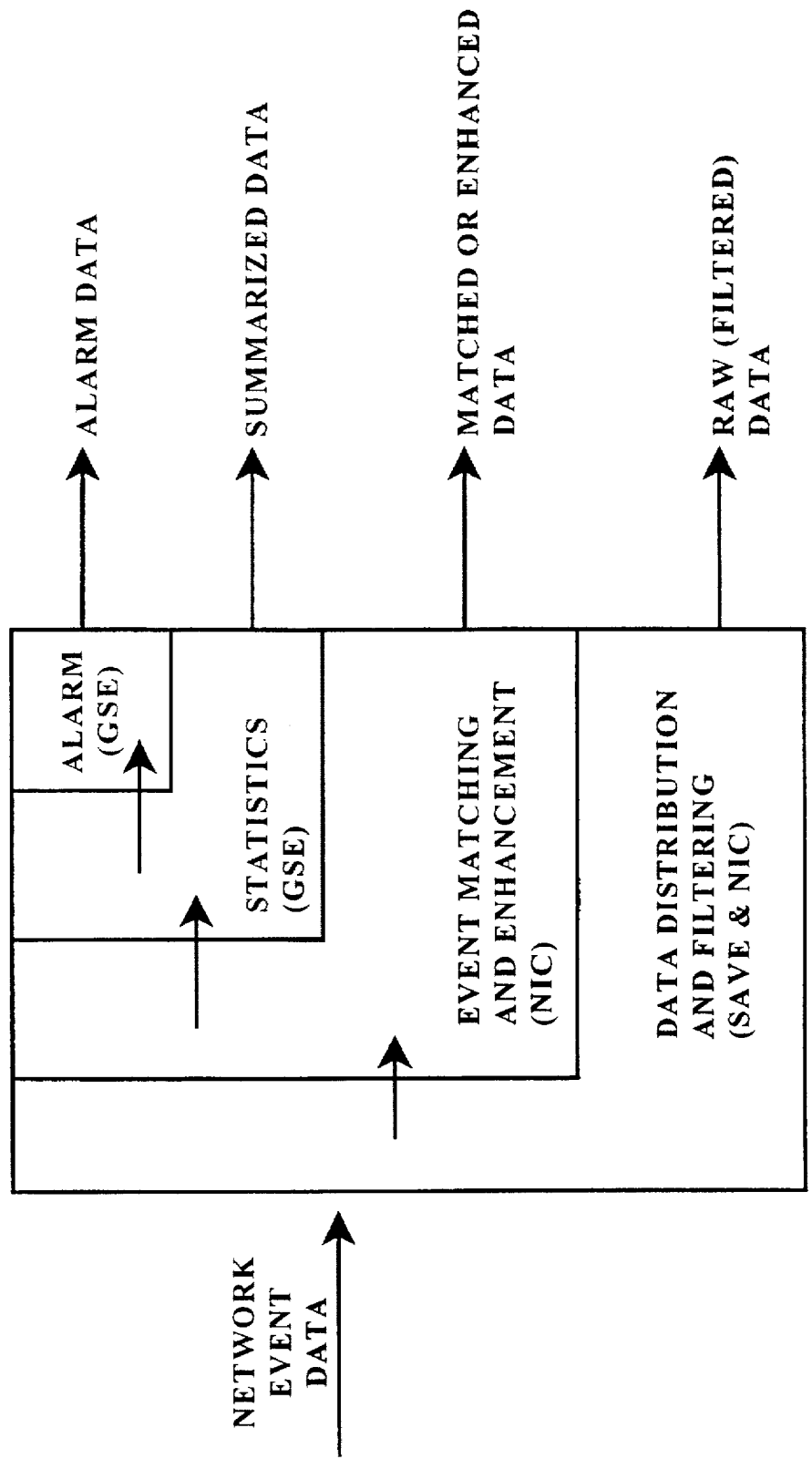
FIG. 2B is a schematic illustration of processing, by the present invention, of network event data.

FIG. 2B is a schematic data flow diagram indicating the processing of network event data through the network information architecture constituting the present invention. Typically, network event data pertains to billing records such as Call Detail Record (CDR), Service Billing Record (SBR), Call Event Record (CER), Application Data Field (ADF) and Billing Data Record (BDR). The architecture itself may be viewed as four levels of processing to allow a client to tap into any of the four levels.

The first level of processing is data distribution and filtering achieved by both the SAVE 14 and the NIC 34, as will be explained hereinafter. The output from this level will be raw data (without enhancement) but will be filtered so that only useful data for a downstream client is made available. A second level deals with event matching and enhancement produced by the NIC 34. The output from this level will be matched or enhanced data, also to be explained hereinafter.

A third level relates to network statistics achieved by a Generalized Statistics Engine (GSE) indicated in FIG. 2A by reference numeral 66. The purpose of this engine is to generate summarized statistical network events, for example those pertaining to 800 or 900 number calls. A further major feature of the present architecture is the generation of alarm data which is detected by the GSE. The GSE is discussed in greater detail hereinafter.

Figure 3A:
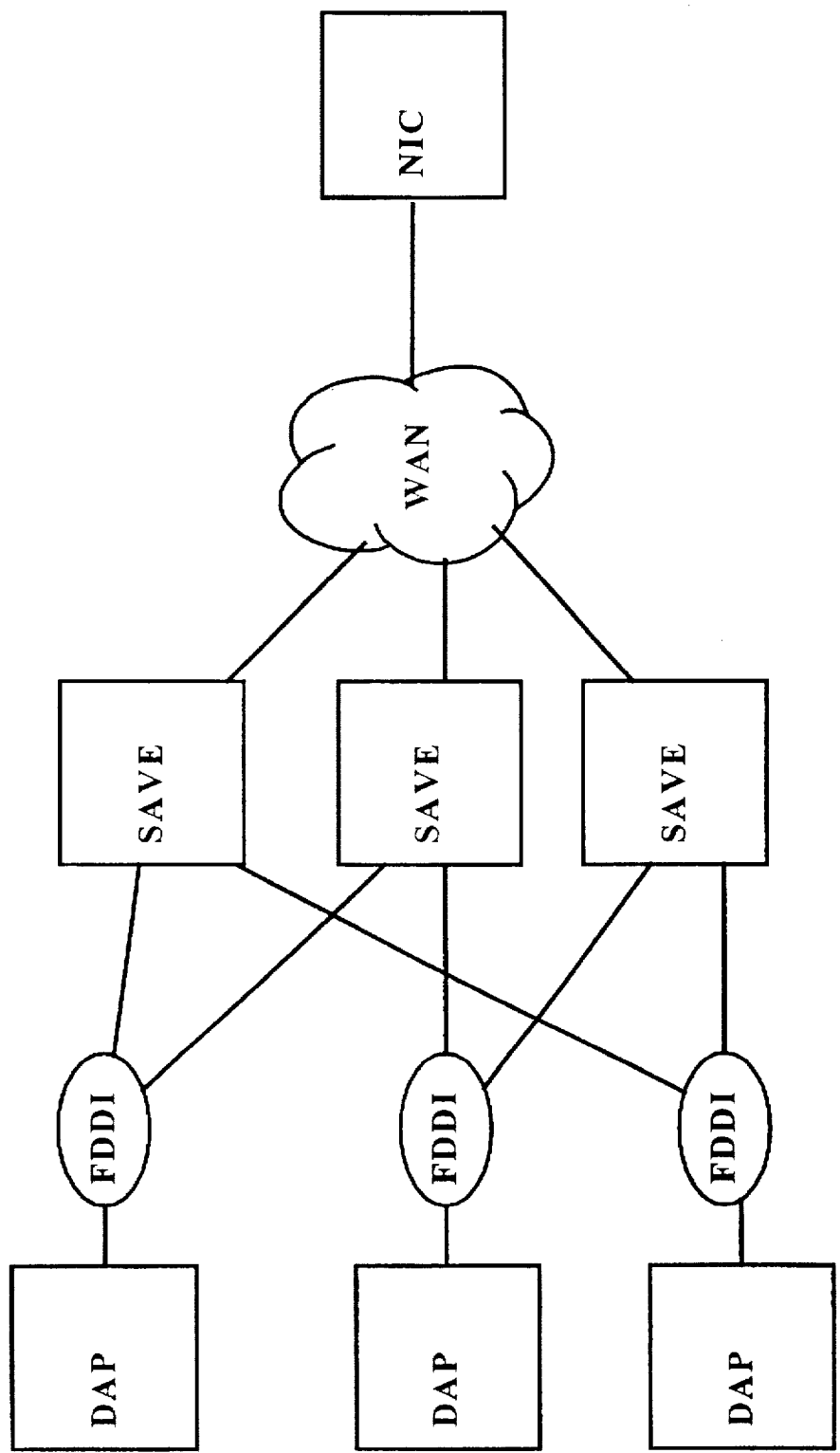
FIG. 3A is a block diagram showing the inclusion of a fiber optic interface between data access points and SAVEs.

FIG. 3A illustrates in greater detail a typical connection between several data access points (DAPs) 32 and SAVE 14 at the front end of the network information concentrator (NIC). More particularly, in the example of three SAVEs, the output of each DAP 32 is seen to communicate, via a fiber optic interface (FDDI), with three SAVEs. One communication link from each FDDI is active, while the other provides a redundant standby path in case the first link is disabled. A wide area network (WAN) is interposed between the SAVEs and the NIC.

Figure 3B:
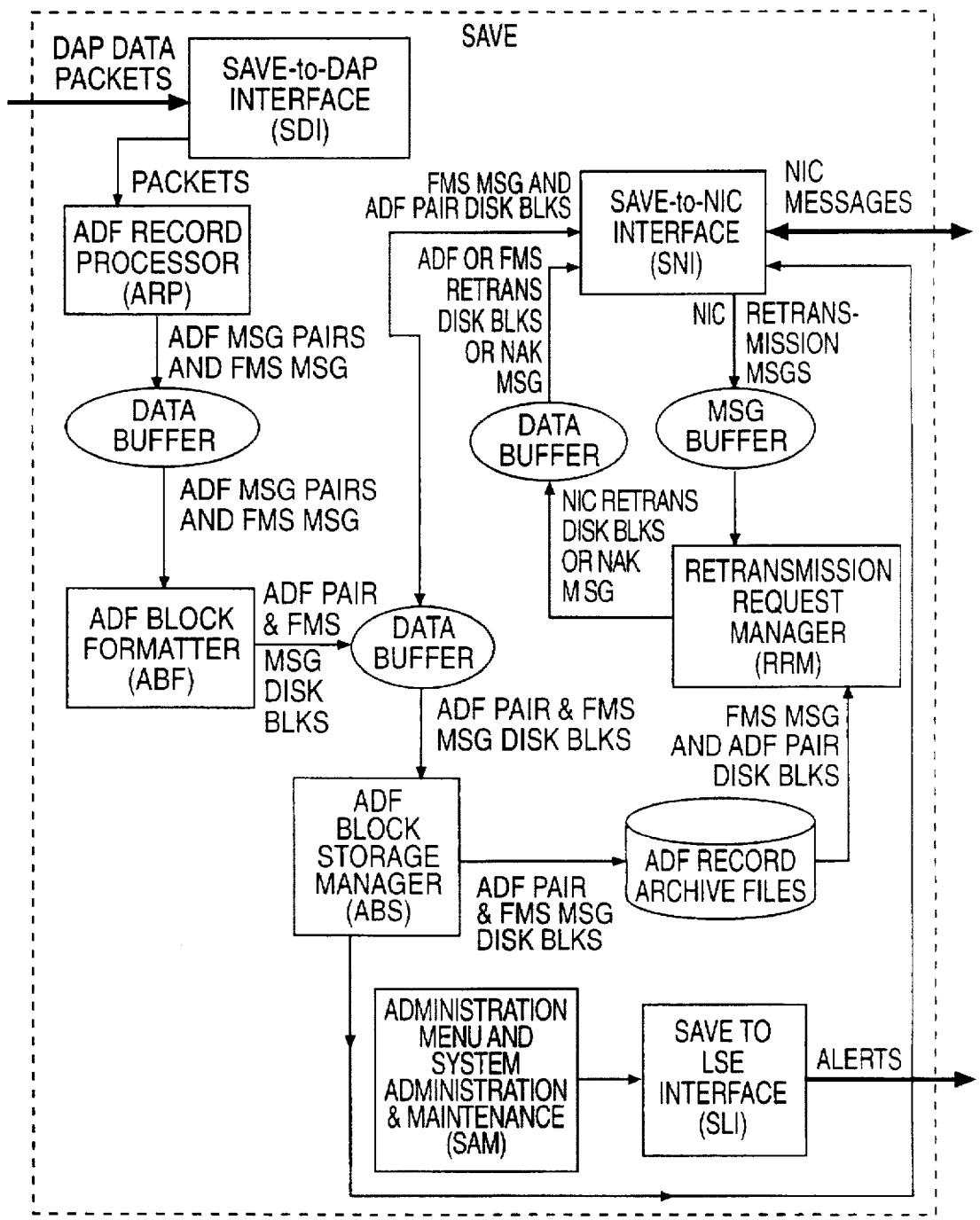
FIG. 3B is a data flow diagram of the SAVE connected at its input to a DAP.

FIG. 3B is a system block diagram of the SAVE system illustrating data flow. An input to the SAVE is, for illustrative purposes, indicated as network packets of data output from a DAP (see 32 in FIG. 2A). A SAVE-to-DAP interface (SDI) introduces the packets into the SAVE, and more particularly to an ADF Record Processor (ARP) which extracts raw data from packets. Particularly, this subsystem is responsible for disassembling the input data packet into its constituent application data field (ADF) message pairs. The message pairs are then stored in a data buffer along with other types of preselected messages, such as messages from a Fraud Management System (FMS), included in the data network but not discussed herein. After buffering, the message pairs and FMS message is input to an Applied Data Field Block Formatter (ABF) which reads the queued ADF message pairs and the FMS message and creates disk blocks of a preselected size, padding out the disk block as needed. This subsystem also sets a block sequence number by which the block will be referenced in the future. The resulting block is then queued in a data buffer which splits the disk blocks. One path for the disk blocks is a SAVE-to-NIC interface (SNI) which generates messages for the NIC corresponding to the disk blocks. The disk blocks are also input to an ADF Block Storage Manager (ABS) which is responsible for archiving, on the indicated ADF record archive files, the blocks containing ADF message pairs and FMS messages to an appropriate disk data file. The ABS maintains information pertaining to the sequence numbers of the data blocks written to the disks to support block retransmission. The ABS has a second output, constituting a confirmation message that is input to the SNI which enables the transmission of NIC messages. There are instances in network operation when it is necessary to retransmit ADF message pair data to the NIC. The SNI would receive such retransmission requests from the NIC and process such requests to a Retransmission Request Manager (RRM), after buffering in the indicated message buffer. The RRM validates the request. If the request is for a valid file and the start and end block sequence numbers are also valid, the requested data for transmission is retrieved from the hard disk where the data was stored (ADF Record Archive Files) and, after data buffering, is input to a retransmission input of the SNI for transmission to the NIC. In the event the data, requested for transmission, is impossible to retrieve, a negative acknowledgement message (NAK) is generated by the RRM and handled by the SNI as a response to the NIC.

In order to orchestrate all system administration, alarm processing and resource management, a processor, such as, but not necessarily, the IBM Netview 6000 is employed. Functionally, this processor is indicated in FIG. 3B as the Administration Menu And System Administration And Maintenance (SAM) box. Typically, administration menus are generated for system operators which allow the monitoring of the system and detection of alarm conditions. These types of processes are well-known in the art and are currently used in conjunction with DAPs.

The SAVE-to-LSE Interface (SLI) subsystem retrieves system alerts sent to it by the SAM and sends alert messages to an appropriate network component (not shown) such as a local support element (LSE). Typically, such alerts are transmitted to an LSE via a TCP/IP protocol connection.

Figure 3C:
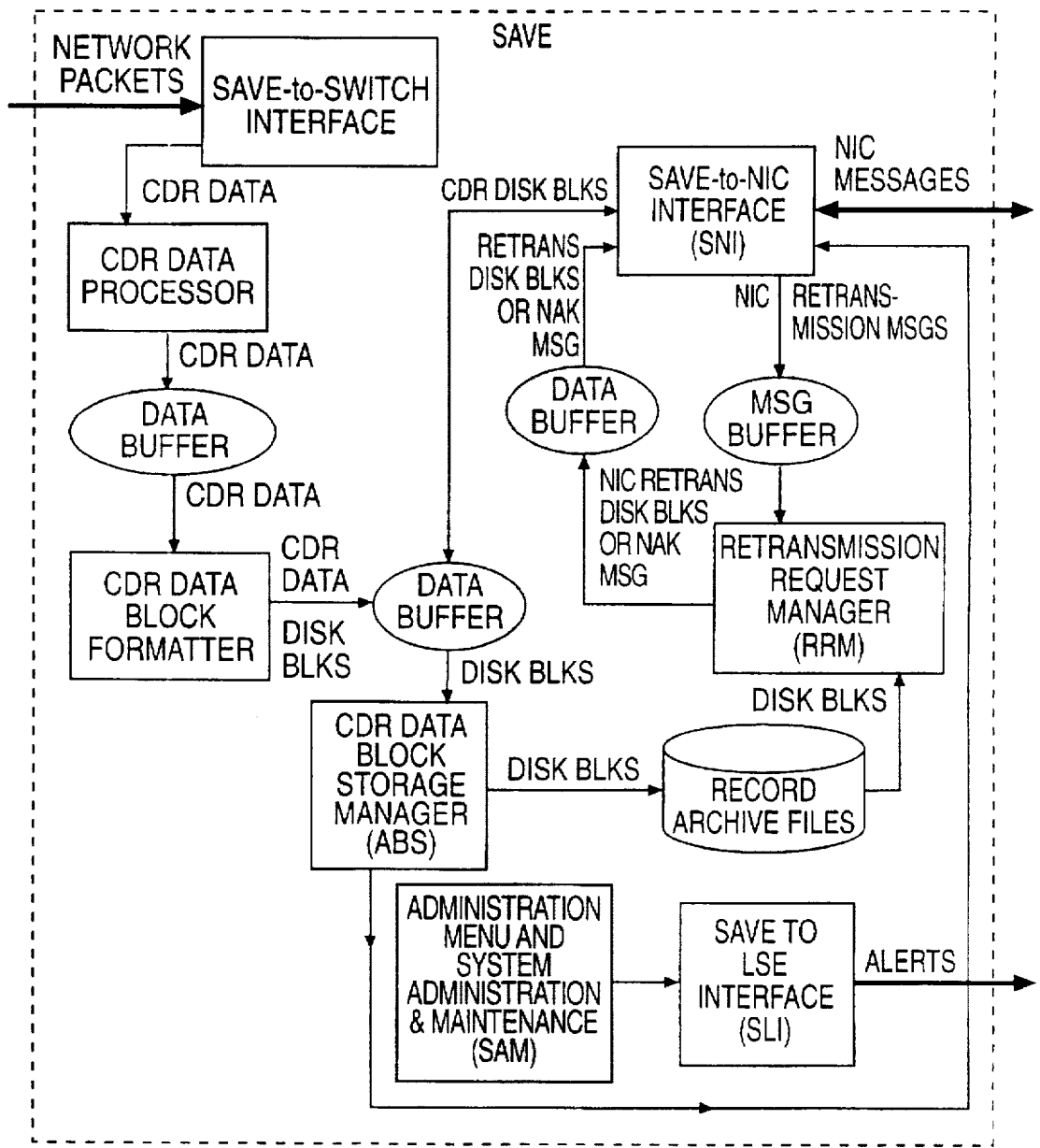
FIG. 3C is a data flow diagram of the SAVE connected at its input to a network switch.

FIG. 3C is similar to that of FIG. 3B and indicates the SAVE processes when connected to a network switch 10 instead of a DAP, as indicated in FIG. 2A. The input to the SAVE will be network packets relating to switch call detail record data (CDR) instead of ADF pair and FMS messages, as was the case for the system of FIG. 3B. Other than the type of data processed within the SAVE, the operation of this system remains identical.

Figure 4:
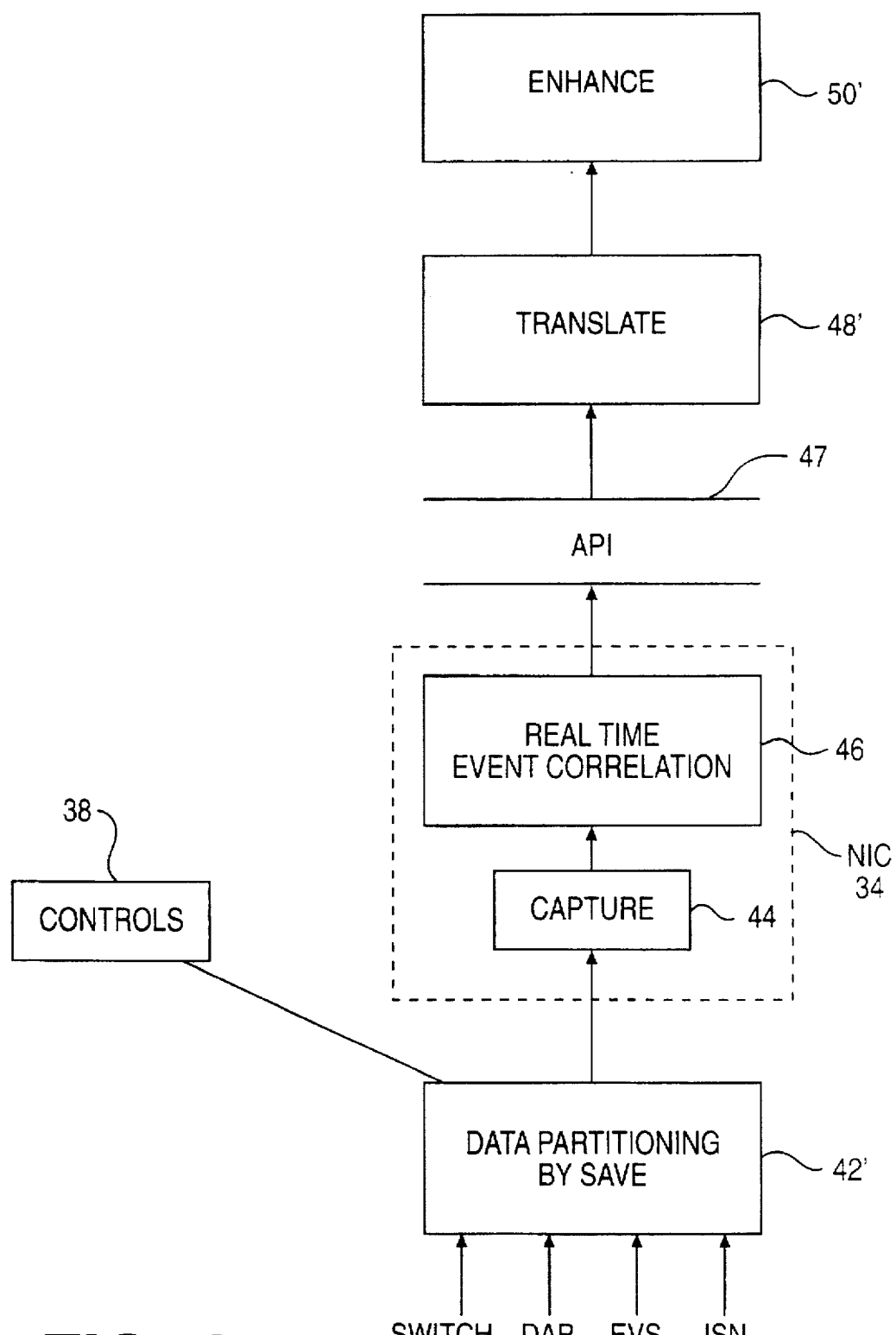
FIG. 4 is a functional block diagram indicating the partitioning of data from network elements.

FIG. 4 represents a functional block diagram of the basic network information architecture. The lower portion of the FIG. includes data from various types of network elements generally indicated by reference numeral 40. They may include a network switch, such as switch 10, a DAP 32, an enhanced voice systems (EVS) platform, or an intelligent services network (ISN) platform. The data partitioning function 42' involves the collecting of data elements from network elements on a call-by-call basis. A particular call is tagged by the network via a customary network call ID tag, which is carried along to each involved network element for the call. Accordingly, the data partitioning function occurs on the call level, and collected data elements undergo hard point data storage. Function 42' is carried out by each SAVE 14.

A succeeding data capture step occurs at 44. The function is actually carried out within the NIC 34. The real time event correlation function 46 ensures that data being partitioned is neither lost nor duplicated. Reference numeral 47 represents an application program interface (API) for users which enable them to acquire raw network data from the various network elements in the network. End customers may require such raw network data. Functional steps 48' and 50' represent additional services which may be offered to a customer who has acquired raw data. Namely, translation of the data to different formats is indicated by function 48', while an enhanced data function 50' is indicated. Enhancement may be the combining of various types of data to obtain new results, as desired by the customer. Such enhanced data would, of course, require communication to customers by means of a further application program interface (API). It should be mentioned that the APIs envisioned are of the type customarily used in communication protocols.

The indicated controls function 38 controls data sequencing, gap-duplication deletion, and re-transmission of lost data. The controls function operates upon call detail records (CDRs) that are generated by a switch or other network element 40. All such records have a sequence number written called the call disconnect identifier (CDID). These CDRs are bundled into blocks of records, typically 31 in number, with at least one "end of block" switch event record (SER). The blocks are transmitted from the switch or network element thereby making such element a data source to the SAVE data partitioning function 42'. At this point, the SAVE takes on the role of being both the hard point and the data continuity detector. In order to ensure data integrity, the blocks are "deblocked" and the CDIDs of the CDRs are analyzed for sequential integrity. That is, the verification that no CDIDs are duplicated or missing. As these sequence numbers are validated, they are "reblocked" as received and are assigned a new block sequence number and sent downstream to NIC 34. The NIC is now a data receiver, and, as such, it monitors the data stream being received, assuring that all data is received in order. If any anomalies are identified within the CDIDs, the NIC sends a message to an appropriate SAVE identifying the problem, while a request for retransmission is sent to the switch or network element for the missing or questionable data. This is explained in greater detail hereinafter, in connection with the detailed function diagrams of the NIC.

Generalized Statistics Engine 66

Data incorporated in call detail records, obtained from network switches, are subjected to processing by Generalized Statistics Engine (GSE) 66 which maintains separate counts for CDR events relating to certain calls, such as 800 number and 900 number calls. These events, such as attempted calls, completed calls, and duration, form statistics for network users. Compilation of statistics may be done for different services, such as total summary counts and counts by originating area code. The statistical counts for the various services are compiled in accordance with the 800 number or 900 number called. The Network Information Concentrator (NIC) 34 collects, at a single point, call records from various network elements. This enables the concentrator to create data buffers of CDRs that are input to the statistics engine for processing.

Statistic Hierarchy

FIG. 9 is a schematic representation of the statistic hierarchy employed in connection with the Generalized Statistics Engine (GSE). At the top of the figure, a called 800 number is indicated as (800) 254-6575. For this 800 number, a network user may be interested in obtaining a summary of statistic totals within a time period, for example, on an hourly basis. This defines a Totals Summary service. For this Totals Service, statistics are gathered from network switch call detail records (CDRs) relating to the total number of attempted calls, completed calls, etc. For each of these statistics, an updated count is maintained. The relationship of the individual statistic events and their corresponding counts is defined as a Count Group. The Count Group for the Totals Summary service is indicated by reference numeral 90. A second Count Group 92 is indicated for the same 800 number but with statistics for a different service. In this case, the service relates to all calls made to the same 800 number from a particular area code. This may be referred to as an NPA service. In the case of this service, typical statistics again include attempted and completed calls. However, unlike the previous example in connection with Count Group 90, the Count Group 92 statistics relate to calls made from the particular area code.

Other services relating to the 800 number may be tracked for a particular network user. The relationship of all Count Groups for the various services, is maintained in a Count Registry 94. In the example shown in FIG. 9, only two services are indicated, namely, Totals Summary and Area Code. This set of services constitutes a Service Vector. Obviously, as the number of services are tracked for a Count Registry, the Service Vector is expanded, correspondingly.

Figure 5:
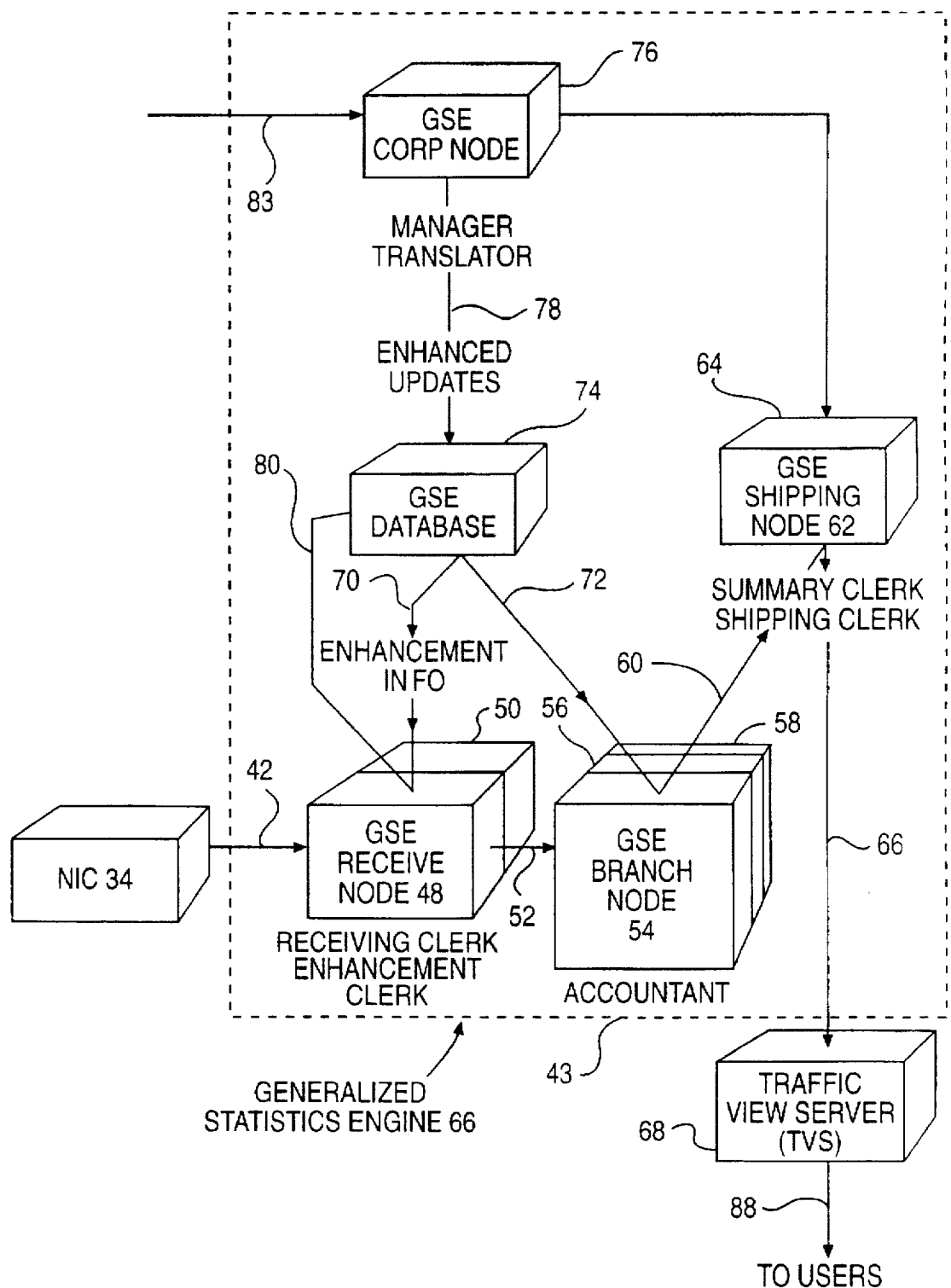
FIG. 5 is a block diagram of the architecture incorporating a novel generalized statistics engine, as employed in the present invention.
Figure 6:
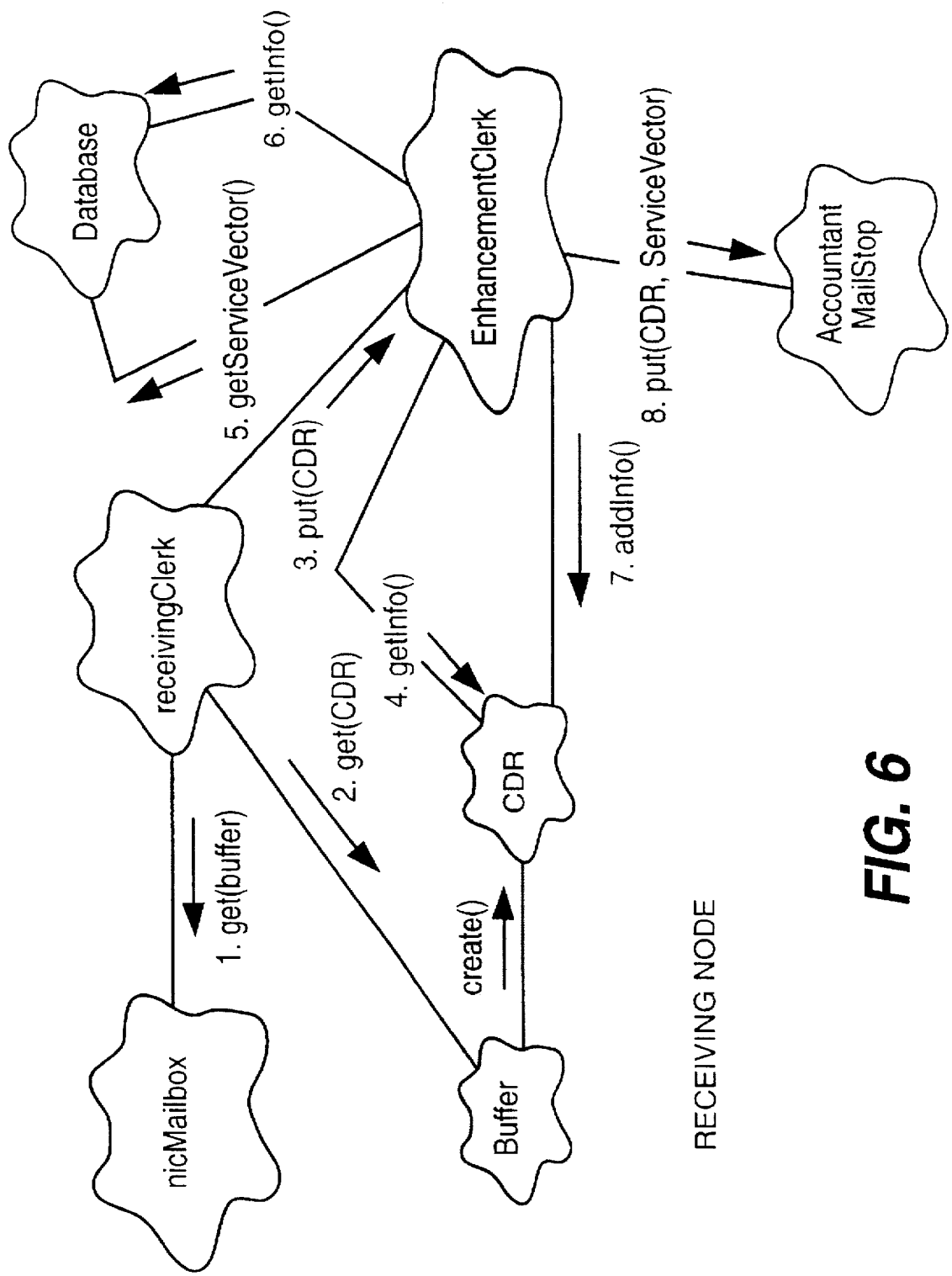
FIG. 6 is an object diagram of a receiving node, as employed in the generalized statistics engine.
Figure 7:
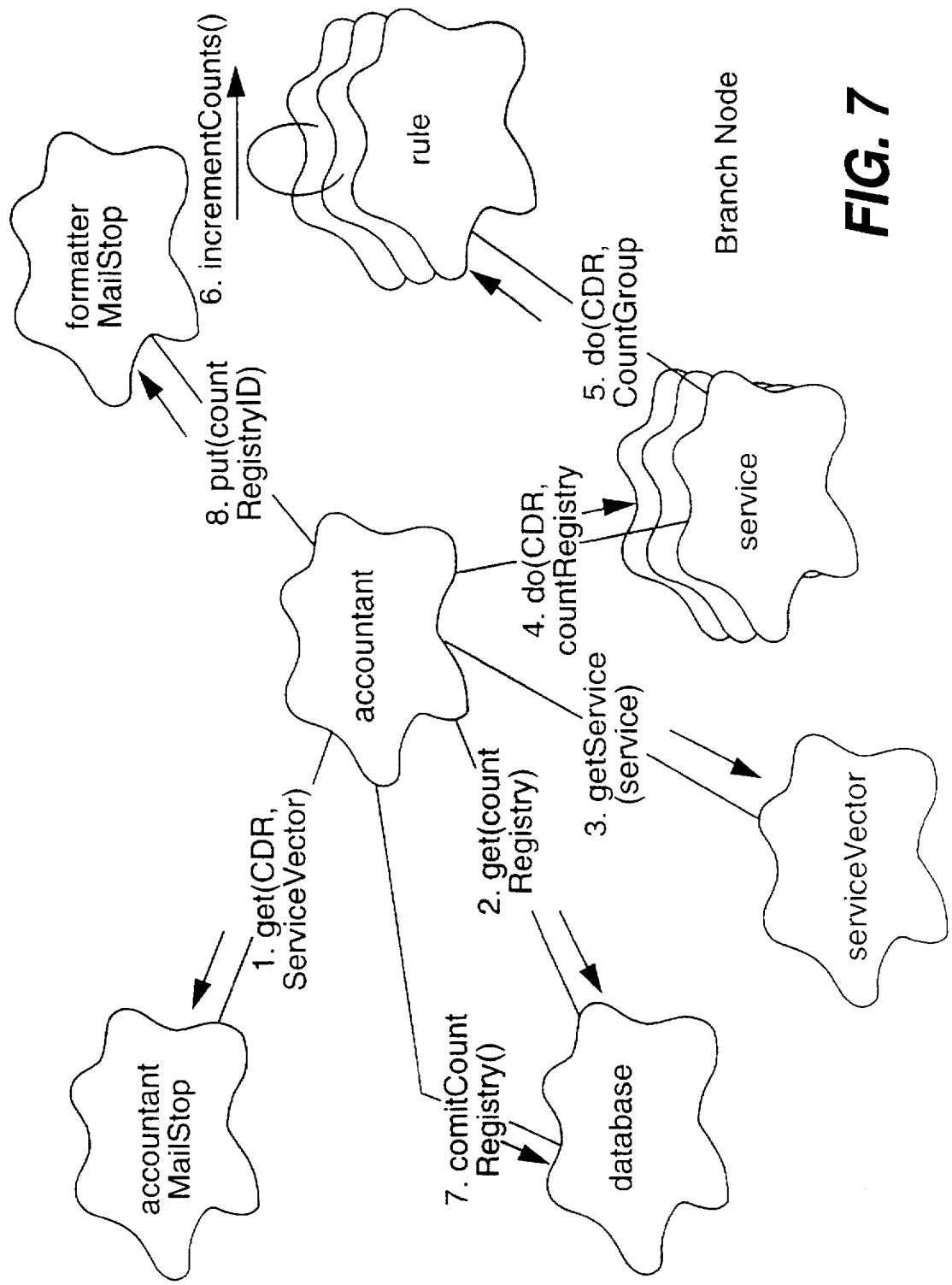
FIG. 7 is an object diagram of a branch node, as employed in the generalized statistics engine.
Figure 8:
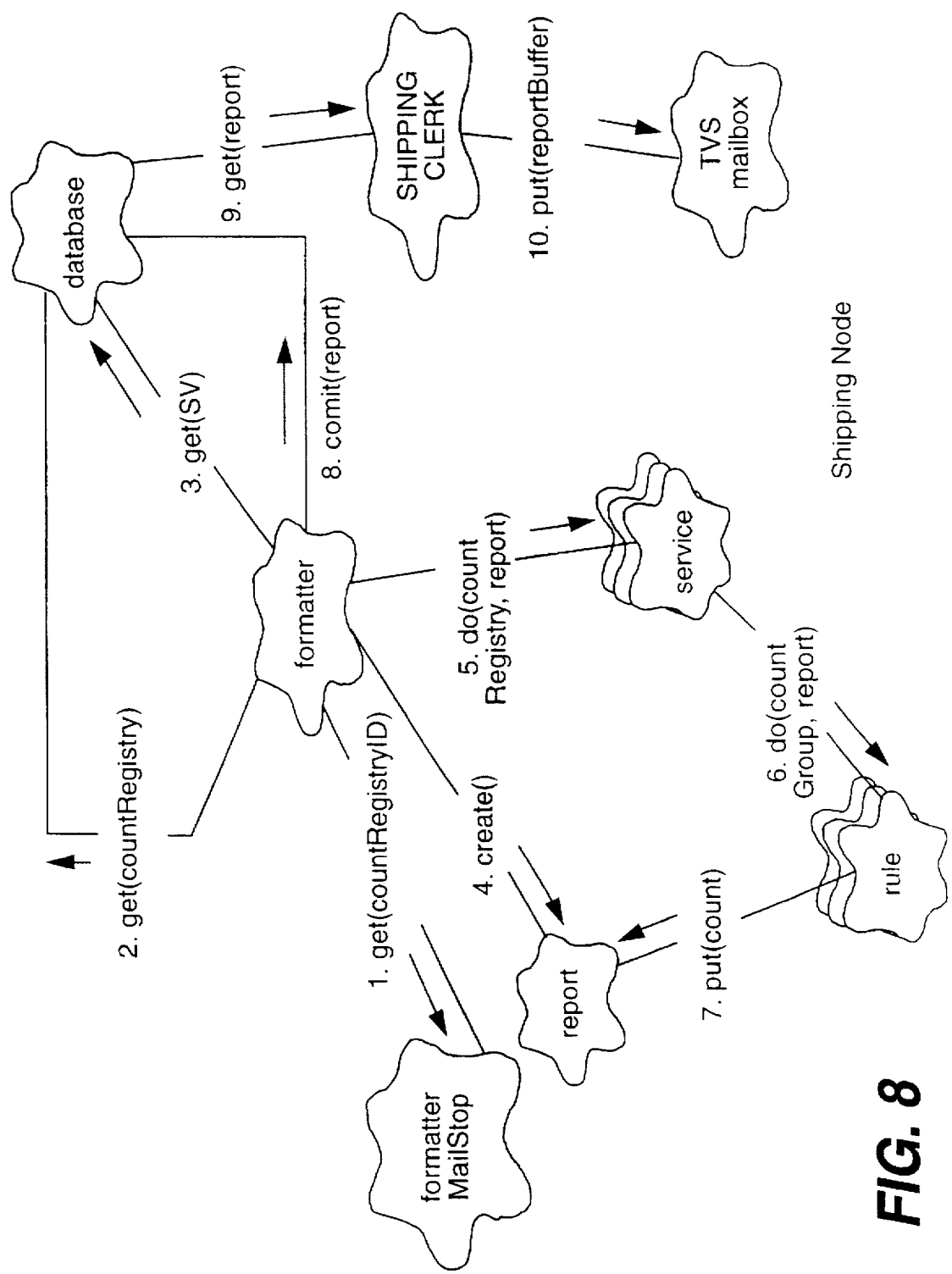
FIG. 8 is an object diagram of a shipping node, as employed in the generalized statistics engine.

The GSE 66 preferably takes the form of a distributed processor. The architecture for the GSE will now be discussed in connection with FIG. 5. This is followed by an explanation of object diagrams (FIGS. 6–8). Initial processing occurs in multiple receive nodes, such as 48 and 50, which operate similarly, but distribute the incoming CDR buffers (42). In terms of hardware implementation, the various nodes of the GSE 66 may be DEX processors defined as Alpha Sable. These processors use an OSF operating system. A first process accomplished by the receive node 48 is referred to as a "receivingClerk" process. Qualitatively, this process unbundles individual CDRs from incoming buffers 42.

Each of the receive nodes 48, 50 implements a second process, referred to as an "enhancementClerk". The function of this process is to check each CDR against a look-up table contained within the database 74 for selecting 800 numbers for which statistics are to be tracked. The information concerning the 800 numbers to be tracked is transferred from the database 74 to the receive nodes 48, 50, via line 70. Typically, only those users who have subscribed to the statistics service may have their 800 number calls tracked for statistic evaluation. The receive nodes 48 and 50 then transfer the CDRs of interest to one of several branch nodes 54, 56, 58. The branch nodes are identical and operate in round-robin to distribute the incoming load from the receive nodes. The branch node implements a process referred to as the "Accountant". This process completes statistical counts of preselected statistical network events. In the example previously given for a statistic service corresponding to summary total events, the service involved would relate to a totals summary, and the individual events for that service would include items such as total attempts, total completions, and total duration for calls. The array of services selected is referred to as a service vector and it contains a pointer into the database 74. In this manner, the enhancementClerk of the receive nodes 48, 50 may obtain a service vector, along line 80 and the receive node 48 may process for a specific service vector which constitutes a series of pointers back into the database 74. A service vector and a corresponding CDR is then transferred to an appropriate branch node (54–60) where an Accountant Process performs a statistics count for each of the events covered by each service included in the service vector.

The database 74 also provides the rules for incrementing counts relating to the individual network events of a service. The decisional rules are provided to the branch nodes 54, 56 and 58 from the database, along line 72.

A further node is referred to as the corporate node 76 which receives enhanced data, normally missing from a CDR. One example is area code information that certain older rotary dial phone transactions are unable to provide for the CDR. In this circumstance, by virtue of the trunk and line number for the call, the area code can be deduced and this information provided to the corporate node. A translator process provides the enhanced data updates to the database 74, via line 78. From the database, the enhancement information may be provided to the receive node, as indicated in FIG. 5, along line 70. The corporate node 76 also includes a manager process which is an alarm server for the other GSE processes. This node further has the responsibility of selecting the various branch nodes 54, 56 and 58 in a manner distributing the incoming CDR load to the branch nodes. In a preferred embodiment of the invention, the corporate node is implemented with a DEX Alpha 3600 processor. Periodically, the corporate node signals the end of a statistic acquisition cycle to the receive nodes 48 and 50. Then, the Accountant process of the branch nodes 54, 56 and 58 apply the rules to particular services, as dictated by database 74.

The corporate node 76 also provides a Summary Clerk process, on the shipping nodes 62 and 64, with pointer information for statistics. The shipping nodes, receiving the statistics data along line 60 formats the statistic information into a message format, and conveys it to a Traffic View Server 68, along connecting line 66. A Traffic View Server is a database depository for the statistics which can be accessed by subscribing users (88).

Object Diagrams Of GSE

The following discussion of FIGS. 6–8 relate to the receiving, branch, and shipping nodes, as briefly mentioned in FIG. 5. These FIGS. are object diagrams, also known as Booch diagrams. This type of diagram is explained in the publication *Object-Oriented Analysis and Design with Applications* by Grady Booch, Second Edition (1994). The publisher is Benjamin/Cummings.

Receiving Node

Beginning in FIG. 6, object diagrams for the generalized statistics engine are indicated in connection with sequenced path numbers. The receivingClerk is a process which obtains buffer data from NIC 34 (FIG. 2) which has been filtered so that, in the present example, only 800 numbers for subscribing users will be included in the buffer data from the NIC. This is indicated by path 1. Path 2 indicates the receivingClerk sorting individual CDRs from a buffer wherein CDRs, from the NIC, are stored. Each sorted CDR is created as a separate entity, as indicated by the CDR object in the diagram.

In certain instances, the created CDR has insufficient information. For example, for calls generated on older rotary dial phones, area code information is not directly indicated in the CDR. However, the enhancementClerk process is often capable of determining the area code of a call from other information in the CDR. In order to complete this task, the enhancementClerk obtains the necessary information from the CDR, such as the dialed 800 number. This is indicated by path 4. Before completing its process, the enhancementClerk queries the indicated database (72 in FIG. 5) to determine whether a user has requested a group of services for the particular 800 number. This corresponds to path number 5 in the FIG. If the database (72 in FIG. 5) includes such a group of services, known as a Service Vector, the necessary additional information is obtained from the database (72 in FIG. 5) (along path 6) so as to enhance the CDR by the enhancementClerk. The additional information, for enhancement, is provided to the initially lacking CDR so that it becomes enhanced. This is indicated by path 7. The enhancementClerk can then provide an enhanced CDR and the Service Vector to a hardware buffer interface, referred to in FIG. 6 as the accountantMailStop. In order to communicate the CDR and Service Vector data, in a preferred embodiment of the present invention, conventional TCP/IP protocol is employed. Such communication allows the branch node to further process the CDR and Service Vector data.

Branch Node

FIG. 7 indicates an object analysis of the branch node which centers about the accountant process. As indicated along path 1, the accountant obtains the enhanced CDR and Service Vector data from the accountantMailStop buffer of FIG. 6. This aspect of the branch node is represented by path 1.

As a second path, the accountant gets a Count Registry from a database (72 in FIG. 5). The Count Registry is a set of count groups corresponding to a particular Service Vector as pulled from the accountantMailStop.

In path number 2, the accountant retrieves a Count Registry which includes a set of count groups corresponding to a Service Vector. In actuality, the accountant will maintain Count Registries for all 800 number users. Along path 3, the accountant obtains an identification of each service, in connection with a Service Vector, as subscribed to by a user.

Path 4 corresponds to the accountant forming a data message with the statistics of individual services included in a Service Vector. From this point, path 5 is followed to further breakdown the form message to involve CDRs and Count Groups. Decisional rules are applied, based on a CDR, to determine whether statistics relating to each service should have their counts incremented. Path 6 indicates an incrementing of the statistics counts where the CDR indicates that is appropriate. Updated statistics result in an updated Count Registry which is stored back into the database (72 in FIG. 2). In a preferred embodiment of the present invention, the accountant periodically closes the Count Registry and the aforementioned firing of rules. Incrementing of the counts then occurs. Then, the process is repeated to obtain updated Count Registry. The location in the database (72 in FIG. 5), where the updated Count Registry exists, is assigned a Count Registry ID. In path 8, that ID is forwarded to the formatterMailStop (a buffer) indicated in FIG. 7. The purpose of that buffer is to format the count data into a message that can be downloaded to the shipping node of FIG. 8.

The initial function of the shipping node is for a formatter process to obtain the Count Registry ID from the formatterMailStop, which was the endpoint of FIG. 7. Using this ID, the most recent Count Registry may be obtained from the database (72 in FIG. 5), as indicated along path 2. The formatter retrieves the Service Vector corresponding to the Count Registry in order to create a data message format corresponding to a report shell, as indicated in path 4.

Along path 5, the pertinent Count Registry is sorted by service so that Count Groups are obtained along with the report shell. At the end of path 6, rules are fired which involve decisional logic to determine which statistics from a Count Group are to be included in the report (path 7). The items covered by the report will of course depend upon the particular service being subscribed to by the network user.

The shippingClerk process retrieves the report, from the database, as an object (path 9). The shippingClerk then puts the report in a buffer along path 10 where there is a conversion of the report to bitstream data in the form of a usable data message buffer. The converted report is then stored in another database which is accessible by the Traffic View Server (TVS 68, FIG. 5) where it becomes accessible by the network users subscribing to the statistics service.

Decisional Rules

Figure 10:
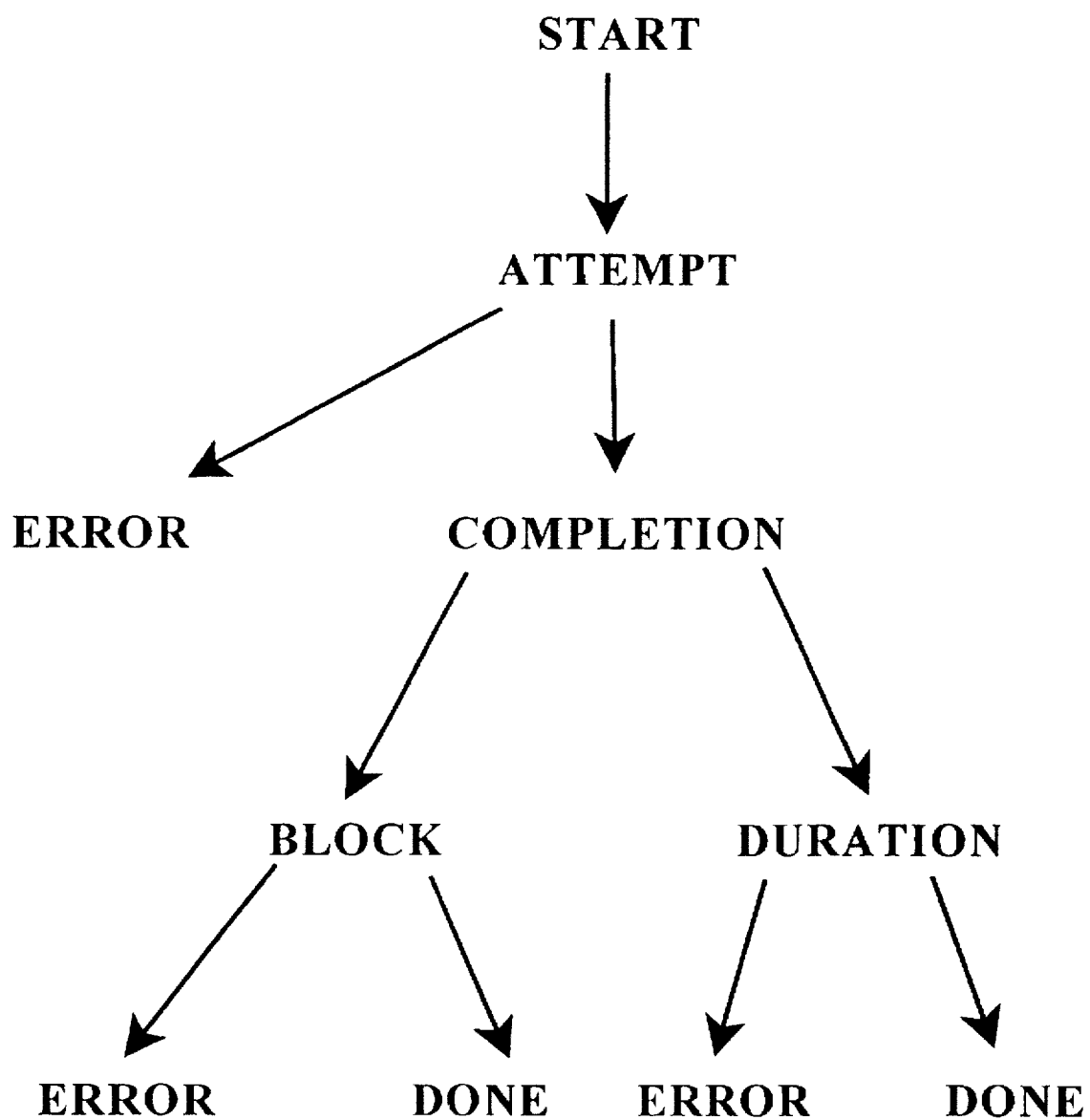
FIG. 10 is a schematic tree diagram of a rule for determining whether counts should be incremented in a particular statistics service, in accordance with the present invention.

FIG. 10 is a diagrammatic illustration of a typical rule applied during processing by the GSE. The illustrated example specifically shows the rule for the Totals Summary service, as explained in connection with FIG. 9. At the start, the data for a CDR is reviewed to ensure that a call has been attempted. In the event that it is not, an error signal is returned and the application of rules to the CDR is terminated. If an attempt has been completed, the count is incremented in the Count Group 90 (FIG. 9). Next, a check is made to see whether the call was completed. In the event it was not, the rule progresses to determination as to whether the call was blocked. If it was not, application of the rule is terminated since the lack of completion and the lack of a block is synonymous with an error. In the event that a block is detected, an appropriate entry (not shown) would be made in Count Group 90 and application of the rule is thereby completed. As further indicated in FIG. 10, if there is a completion, the rule continues to a determination of the call duration from data contained in the CDR. The duration would constitute a separate count (not shown) updated within the Count Group 90 (FIG. 9). In the event that the CDR did not include duration information, an error would be returned, and the duration count would not be incremented. It should be mentioned that, in FIG. 10, the rule includes a block statistic event. However, in reality, a number of different types of blocks would form the statistics for which individual counts would be kept.

A great advantage of the present invention as compared with the prior art is seen to reside in the ability of the network to provide easily changed statistics by correspondingly altering the services provided. Statistics for each newly requested service is simply obtained by applying rules relating to counts for the statistics of a service. This is in marked contrast to changing the programming codes and debugging such changes, each time a network user requests a change in the statistic services rendered, as performed in the prior art.

Network Information Concentrator (NIC)

Figure 11:
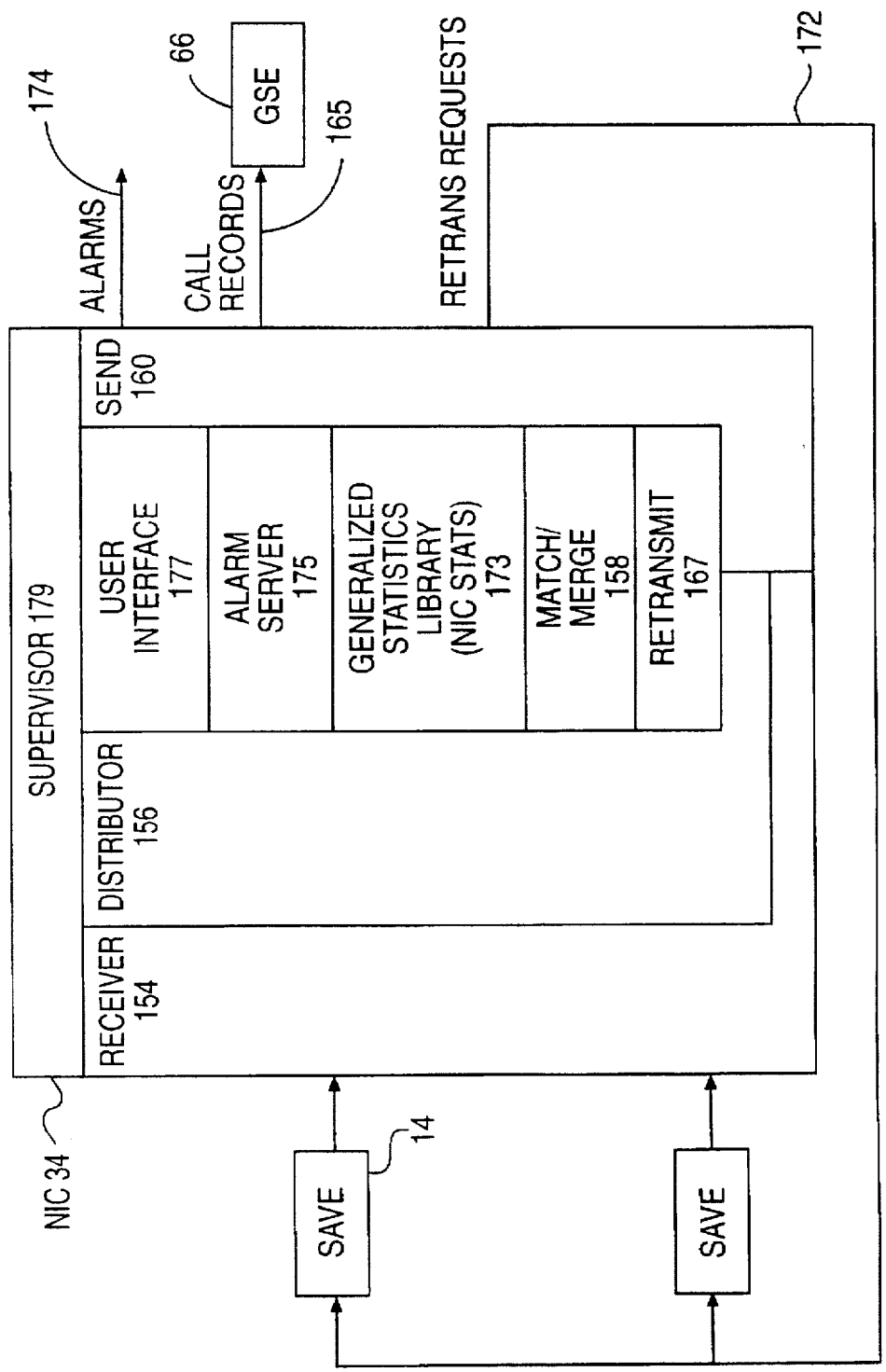
FIG. 11 is a block diagram illustrating, in greater detail, the various functions of the network information concentrator.

FIG. 11 is a block diagram of the architecture which shows the NIC 34 in greater detail. Although the NIC is shown as a single functional unit, it is, in fact, a distributed processor, such as a cluster of IBM RS 6000 units—Model R24. Specifics concerning the various sections of the NIC are treated hereinafter, with reference to FIGS. 12 et seq. The NIC 34 collects a call record data from the SAVE 14 (FIG. 2A). The call record data is obtained from the network which is involved in the path of a call. The SAVE call records are input to a receiver section 154 of the NIC. The receiver section provides the necessary handshaking signals with the various network elements to effect data input to the NIC. The succeeding NIC section, namely the distributor 156, identifies the type of record being processed.

A processor 158 of the NIC performs a match/merge operation of call records generated by network elements. As a result, when a particular call is handled by various elements in the network, the call records are merged by the match/merge 158 so that they may be forwarded as a matched record. A send section 160 of the NIC 34 communicates call records to the generalized statistics engine (GSE) 66 at output 165.

If missing call record data is detected, a re-transmission request may be made to the receiver section 154 of the NIC 34, which will re-transmit the requested call record data, if it is present in the NIC. Otherwise, the NIC 34 generates the corresponding re-transmission request along line 172, which is fed back to the SAVE which store past call record data. Upon receipt of such a re-transmission request by the SAVE, it re-transmits the requested missing call record data to the receiver section 154 of NIC 34. The re-transmission of requested missing call records is handled through the re-transmit section 167 of the NIC 34. A traffic processor (not shown) also receives statistics concerning NIC event records (NERs). These are provided by the statistics library section 173 of the NIC that receives specific call records from the SAVEs.

An alarm server 175 monitors the operation of the SAVEs and the network elements. In the event of a malfunction or alarm condition, an appropriate signal is sent to a network management platform (not shown). The timing for all communication between the network elements, the NIC sections, and the platforms and processors connected to the NIC output are handled by the distributed processor supervisor section 179 of the NIC 34.

Receiver Subsystem
Data Flow for the Receiver Subsystem

Figure 12:
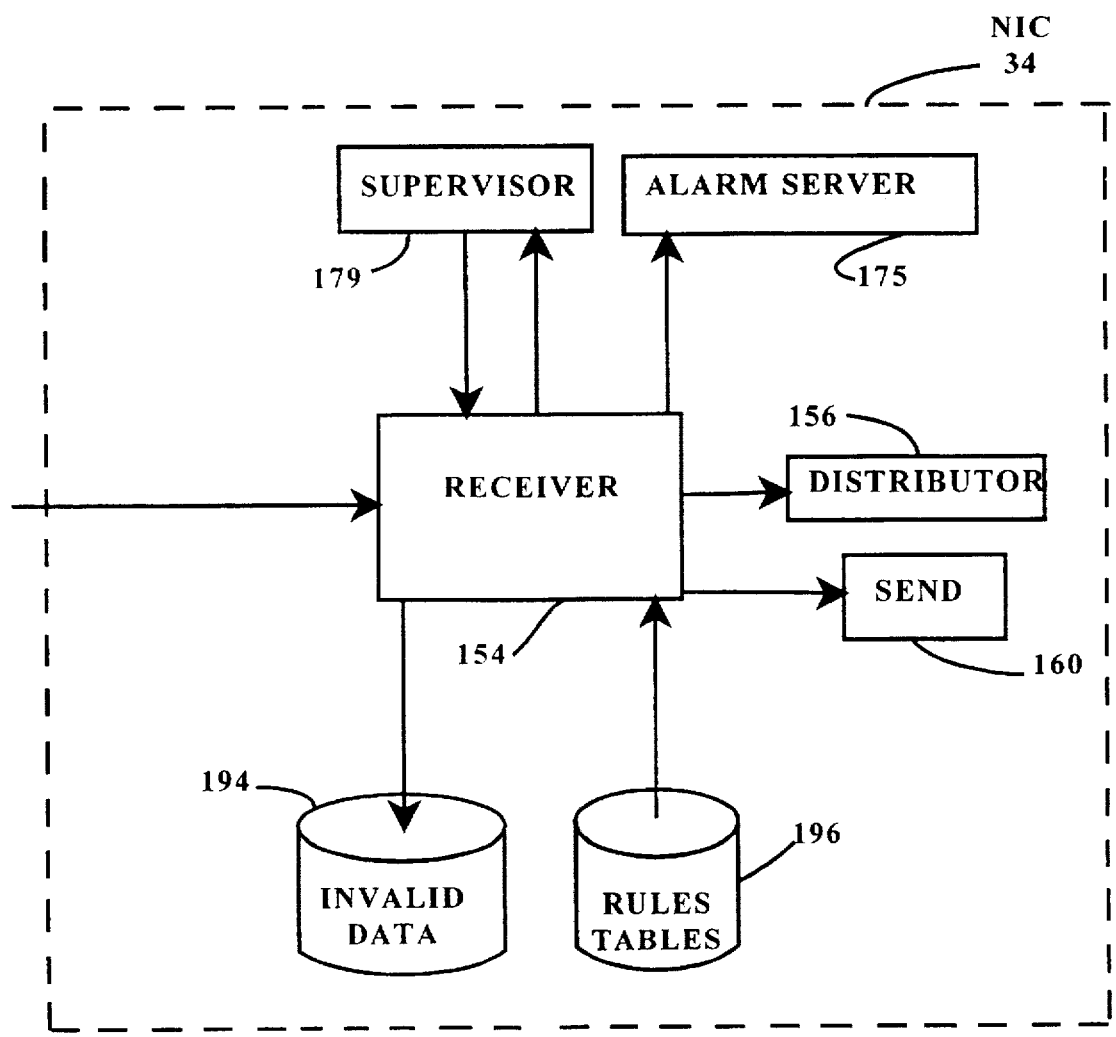
FIG. 12 is a data flow diagram for the receiver subsystem of the NIC.

FIG. 12 is a data flow diagram for the receiver subsystem. The receiver subsystem is responsible for accepting connection/transmission/rejection requests and data from external clients and providing a consolidated feed to internal clients. The feed between the SAVE 14 and the receiver subsystem primarily contains call records produced at the various switch sites. SAVEs that initiate a connection to the NIC are required to pass a registration message once a physical connection is established. This connection also receives retransmission rejection messages and retransmission data from the SAVEs.

A number of subsystems are shown in FIG. 12 within the dotted block of NIC 34. Like the receiver, the subsystems are processes formed by a cluster of digital processors, such as four RS 6000 processors manufactured by IBM and denoted as a Model R24 cluster. The first of the receiver related subsystems includes the supervisor 179 which stores registration information from the receiver. In case of retransmission requests, the supervisor knows which SAVE is involved. In the case of the output from the supervisor 179, this connection provides an input shutdown message to the receiver subsystem. The receiver will then finish vital internal functions and then shut itself down. In the case of the input to the supervisor, an internal feed is indicated which contains the registration and deregistration messages received from all NIC external clients. The supervisor will accept and hold this information and provide it to internal clients.

The alarm server 175 receives alarm messages generated by the receiver subsystem, and these may be related to various errors detected by the receiver. Invalid data 194 may be stored on disk and represents data that cannot be processed upon receipt by the receiver subsystem. The rules table 196 represents a hard disk output to the receiver 154 containing the receiver's rules of operation, initial configuration data, thresholding information, and subsystem control information. These rules are table driven, and read into memory from the receiver's rules files at subsystem startup.

The distributor subsystem 156 is fed data from the receiver which corresponds to a consolidated feed of all SAVE call records. The send subsystem 160 receives data from the receiver 154 and contains reject messages from the SAVEs.

Process Flow for the Receiver Subsystem

Figure 15:
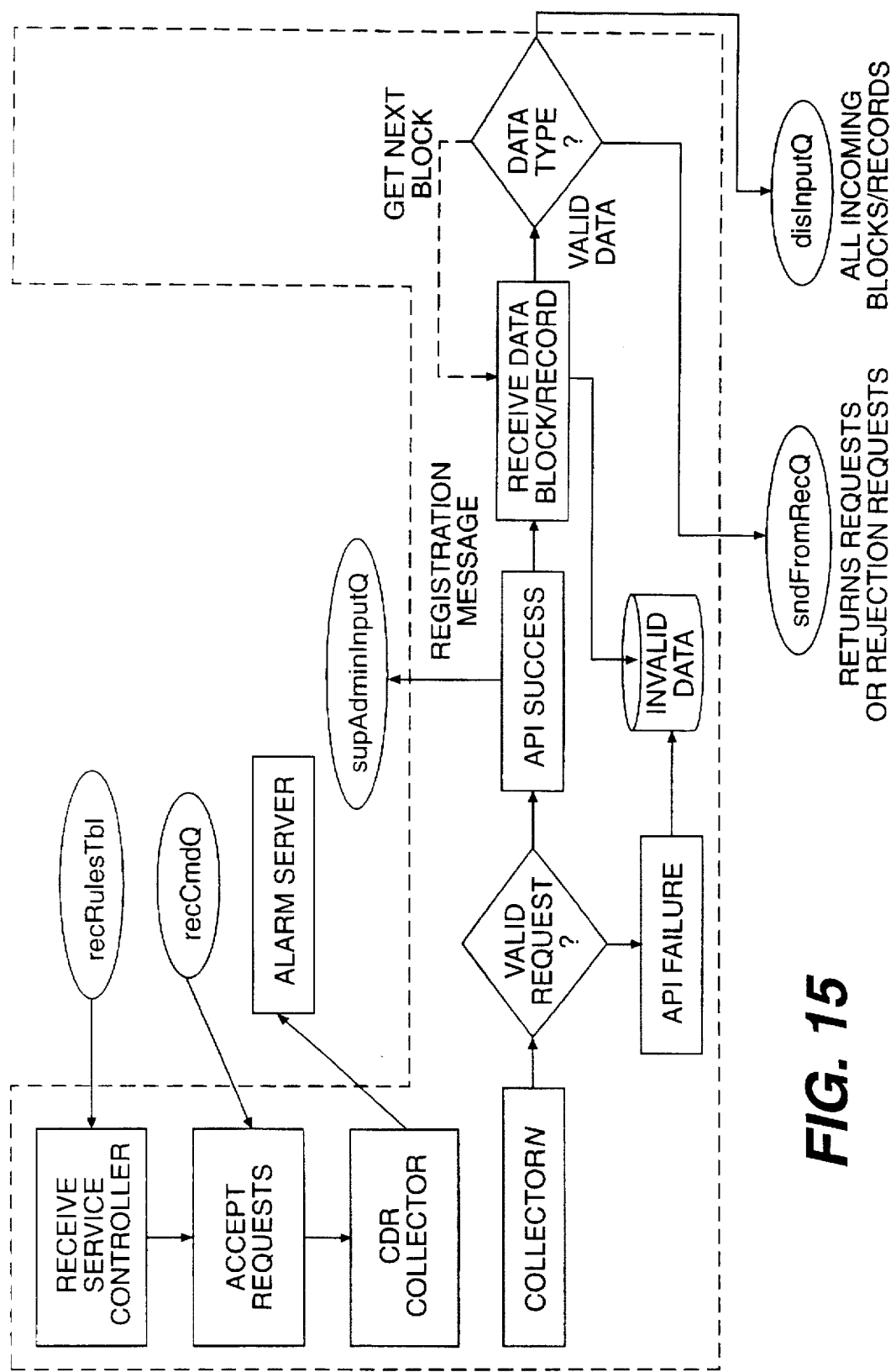
FIG. 15 is a process flow diagram for a receiver subsystem of the NIC.

FIG. 15 represents a process flow diagram for the receiver subsystem. The receiver subsystem is responsible for accepting connection, retransmission, and rejection requests as well as data from external clients and providing a consolidated feed to internal clients. This process only looks at common and client specific application program interface (API) headers it receives to determine the appropriate internal client queue.

The Receive Service Controller function of the receiver subsystem will be started by the supervisor and will run until requested to shutdown. This routine is responsible for performing all the administrative startup and initialization functions of the receiver. If a terminal error is encountered during subsystem startup, an alert is logged and the routine will shut itself down. Fatal errors such as no configuration files, or an unsuccessful attempt to attach to interprocess queues, will generate a critical alarm to the alarm server. The receiver will then shut itself down.

The Accept Requests routine will be executed continuously or until the supervisor requests it to stop. It will be responsible for listening to a UNIX or well-known port for requests to connect to the NIC service. It is this routine's function to accept all incoming connections and start a collector process to manage that connection. After the collector is started, the Accept Request routine will have no other dealings with that specific connection.

It is important to note that no connections are refused by this routine (i.e., no connections are actually accepted on the well-known NIC port). If this routine were to refuse a connection, and the client does not detect the denial, the NIC well-known port would be unavailable to other clients for a time-out period. By having the collector accept all connections and determine platform compliance, it is ensured that an incoming port is always available to accept new connection requests.

The collector processes started by this routine will function as long as the client continues to transmit data. If a service wants to shut down a receiver process, it will inform this routine and the appropriate collector will be notified. The Accept Requests routine will notify collector processes of a shutdown request and wait for them to stop themselves. If the collectors have not stopped after a time-out period, this routine will force them to shutdown and then stop itself.

The CDR Collector processes are started by the Accept Requests routine. They are responsible for receiving data from a dedicated incoming communications port and sending it on to either the distributor or sender input queue. Collectors will be started and pass the connection information from the client. The collector then accepts the connection requests on its own port (not the well-known port the receiver Accept Requests routine listens to). The connection is then complete and the collector can accept information from the client.

In the Valid Request step, the client is required to send a connection registration message to the NIC once the physical connection is established. If the collector process determines the message conforms to the specification, a confirmation message is returned to the client by the API Success routine. Messages that do not conform to the message format are sent to the AP Failure routine to process a rejection message.

Through the API Success routine the collector process will send a positive registration message to a client that sends a valid registration message. Once the client receives this message, they may begin transmitting data to the collector process. At this point, the collector sends the entire registration message up to the supervisor.

Through the API Failure routine, the collector process will send a registration message to a client that sends an invalid registration message. The receiver collector process will then close the connection it received the registration message on, log the alert to the alarm server, and terminate itself.

During the Receive Data Block/Record routine, the collector process will then read the common API header off the incoming connection and determine what the clients' API should look like. If the received header does not conform to the pre-determined specification, the block is considered invalid and the contents will be sent to the invalid data file. The common API header describes how much information is contained in the following structure. The entire structure is read off the incoming connection before continuing to the next step.

When the collector process reaches the Data Type step, the client specific header and data structure have been received and the application now needs to decide whether the data is a retransmission/rejection message for the send subsystem or a normal/transmission block for the distributor subsystem. If the retransmission bit exists in the API structure for this data structure and it is set to true, the data is either a retransmission/rejection message or retransmitted call records from the SAVE. Non-data blocks with this bit set are only sent to the send subsystem's input queue. All other data received are sent to the distributor subsystem's input queue.

Distributor Subsystem
Data Flow for the Distributor Subsystem

Figure 13:
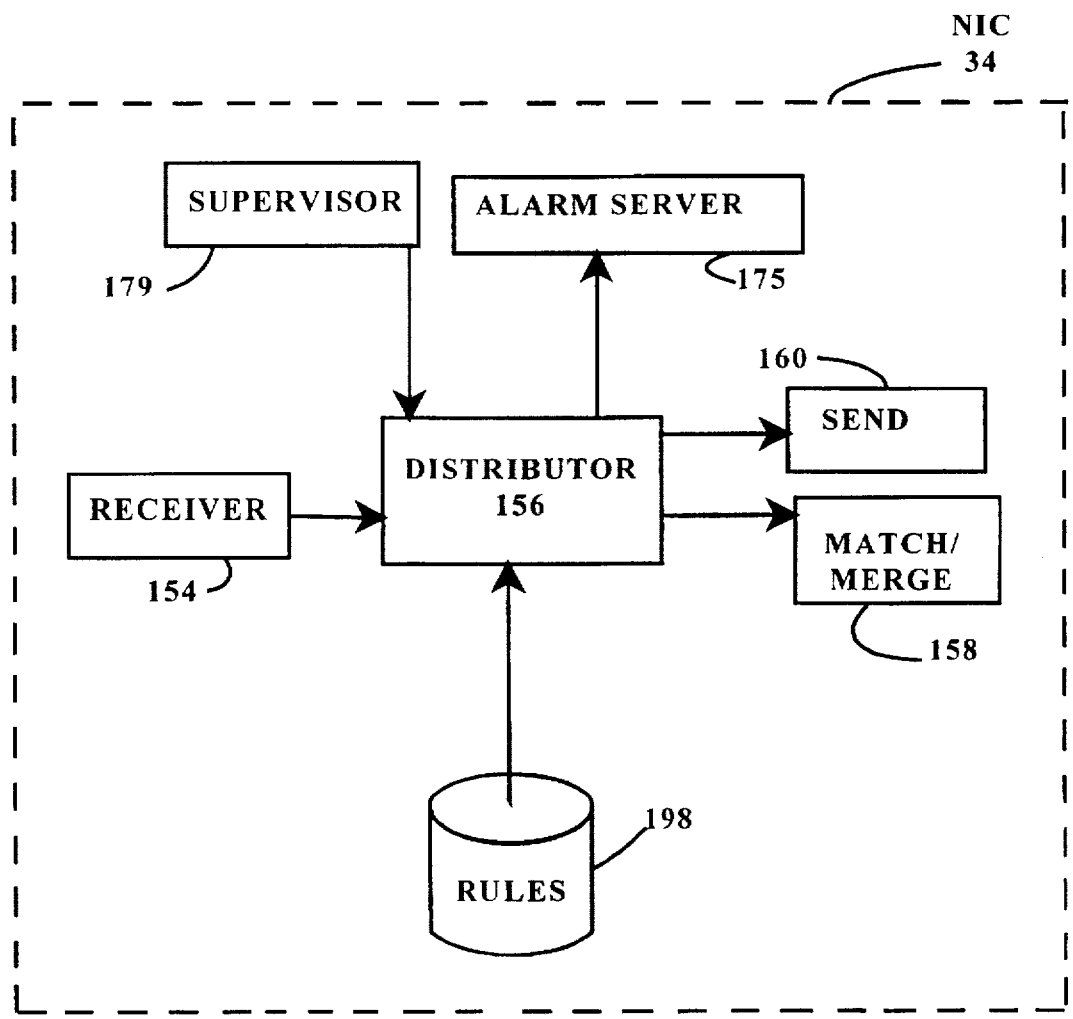
FIG. 13 is a data flow diagram for the distributor subsystem of the NIC.

FIG. 13 illustrates a data flow diagram for the distributor subsystem. Contiguous blocks of call record (CR) data are passed from the receiver subsystem to the distributor subsystem. Rules tables, as in the case of other subsystems of the present invention, are table driven processes, in this case governing the distributor subsystem. Rules will be written to memory from rules files stored on a hard disk 198. There is one distribution rule file for each set of client-based filtering criteria. Each of the table files contains a list of record classifications to be routed to a particular client. There is also a general rule file containing configuration information.

The supervisor subsystem output consists only of shutdown requests. Appropriate CRs will be sent to the match/merge subsystem 158. Appropriate data for the generalized statistics engine 66 are sent to the send subsystem. All alarms generated by the distributor subsystem will be sent to the alarm server.

Process Flow for the Distributor Subsystem

Figure 16:
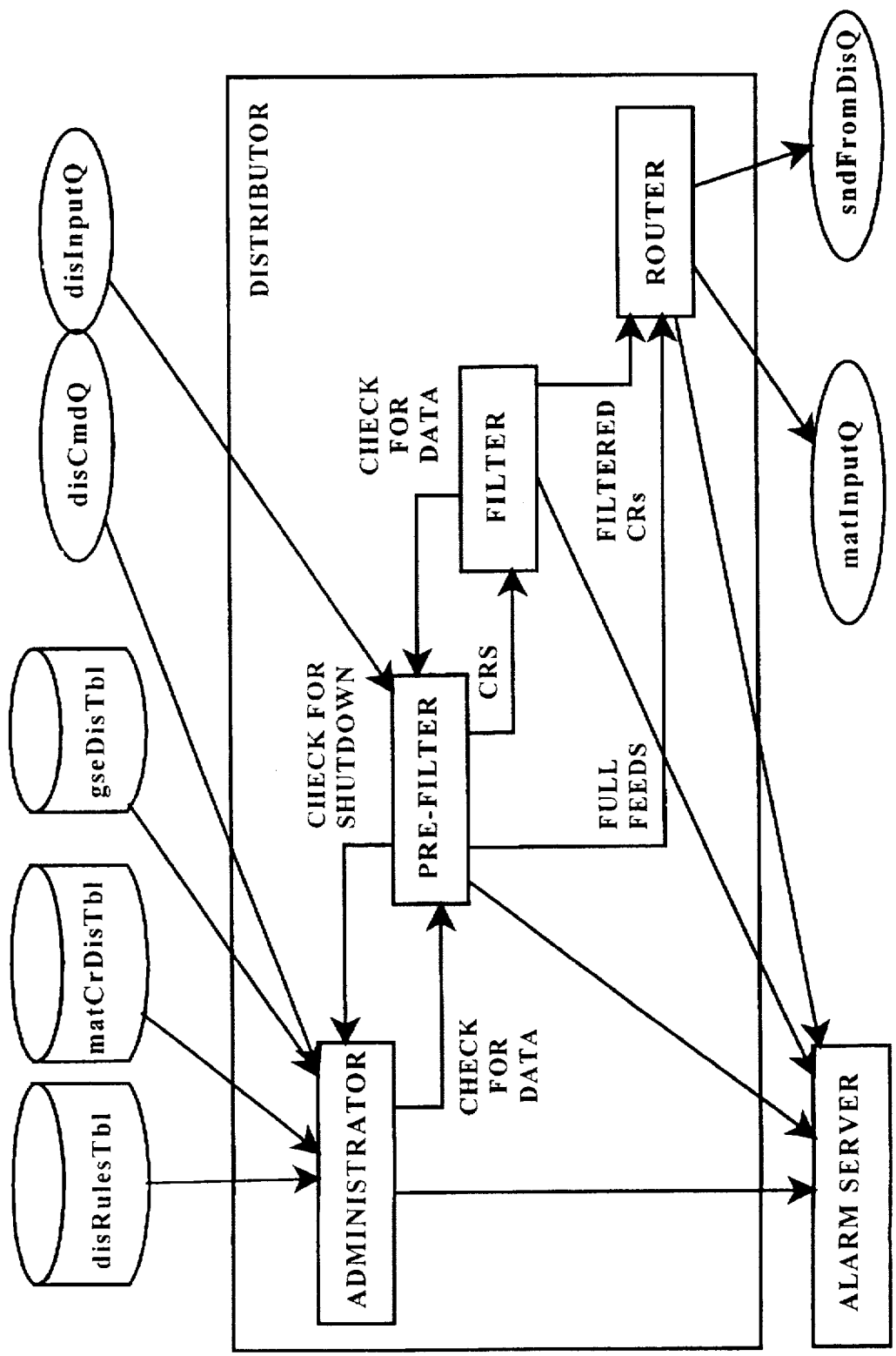
FIG. 16 is a process flow diagram for a distributor subsystem of the NIC.

Referring to FIG. 16, the Administrator module is responsible for the initialization and shutdown of the distributor subsystem. The administrator will first read all appropriate tables into memory. These tables will include disRulesTbl, matCrDisTbl, and gseDisTbl. The disRulesTbl table will contain all configurable information including threshold information and host distribution table names. The matCrDisTbl client-based distribution table will define all CR classifications that will be sent to the match/merge subsystem. The gseDisTbl client-based distribution table will define all CR classifications that will be sent to the send subsystem for the GSE client. The administrator will call the DisReadTable module to read in a set of client-based record classifications from a distribution table.

Next the administrator will connect to the disCmdQ, disInputQ, matInputQ, and sndFromDisQ queues. The disCmdQ queue is the command queue for the supervisor subsystem to notify the distributor subsystem to shutdown. The disInputQ queue is the data queue for the receiver subsystem to feed data records to the distributor subsystem. The matInputQ queue is the CR and BDR feed to the match/merge subsystem. The sndFromDisQ queue is the data feed to the send subsystem from the distributor subsystem. After connecting to these queues, the administrator will attempt to read a message from the supervisor command queue disCmdQ. If there is no command message, the administrator will process it appropriately at that time. In a simplified version of the system, the only command messages expected by the distributor subsystem are shutdown requests. There will be two types of shutdown requests for the distributor subsystem, hard and soft. In the event of a soft shutdown request, the distributor will finish processing all data stored in volatile memory, compile a shutdown alarm, and send the alarm to the alarm server, and then shutdown. In the event of a hard shutdown request, the distributor will compile a shutdown alarm, send the alarm to the alarm server, and then shutdown. If there is no command message from the supervisor subsystem, the administrator will call the pre-filter to process incoming records.

The Pre-Filter module is called by the distributor administrator to process record data. The pre-filter will first initiate a timer to designate when to return control to the administrator to check for a supervisor command message in the disCmdQ queue. This timer will be set to a configurable time. This timer will be checked before reading each message from the disInputQ queue. If the specified time has elapsed, then the pre-filter will return control to the administrator.

If the timer has not elapsed, then the pre-filter will attempt to read a message from the disInputQ queue. This queue is the main data feed from the receiver subsystem to the distributor subsystem. If there is no message in disInputQ queue, then the message type and data type fields in the API will be examined. If the message type indicated retransmitted data, then the pre-filter will ensure that the retransmitted data block is sent to all of the clients who want a full feed of all retransmitted data.

The Filter module is called by the distributor pre-filter when CR data needs to be broken down into filtered feeds. CR data marked as retransmission data will not be broken into filtered feeds in a simplified version of the system. Match/merge and GSE will be the only recipients of filtered record feeds in a simplified version of the system. Once the filter receives a block of CRs from the pre-filter, it will reference the client-based distribution tables in memory to classify match/merge and GSE records.

For each record in the data block, it will traverse the match/merge distribution table, attempting to classify the given record. The filter will traverse the table until a match is made, or the end of the table is reached. If a match is made, then that particular record will be added to the match/merge filtered data block. The next record in the original data block is compared with the entries in the match/merge table. This continues until a match/merge classification has been attempted for every record in the original data block. Next, the router will be called to send the constructed block to the match/merge subsystem.

For each record in the data block, the filter will traverse the GSE distribution table, attempting to classify the given record. If a match is made, then that particular record will be added to the GSE filtered data block. This continues until a GSE classification has been attempted for every record in the original data block. Lastly, the router will be called to send the constructed block to the GSE subsystem.

Classifications using the distribution tables will be accomplished by referencing a nibble and listing the values it should have. For each classification in the distribution tables, there will be one or more criteria, and then an end flag. Each criteria will contain a nibble offset, and a 16-bit field mapping out the desired values for that particular nibble. If a record satisfies all of the criteria in a given classification, then that record will be sent to the appropriate client.

The Router module is called by other modules in the distributor subsystem. The calls to router must pass a destination and a data block. The pre-filter may send full feeds to match/merge by passing the data block to the router, and designating match/merge as the destination. Filter may send filtered records to match/merge and GSE by passing the partial data blocks to router and designating match/merge or GSE as the destination. The router will populate API fields appropriately before sending the data. This may require traversing through a data block to get a record count. If the router encounters a problem, it may compile its own alarm message and send it to the Alarm Server.

The Send Subsystem

Data Flow for the Send Subsystem

Figure 14:
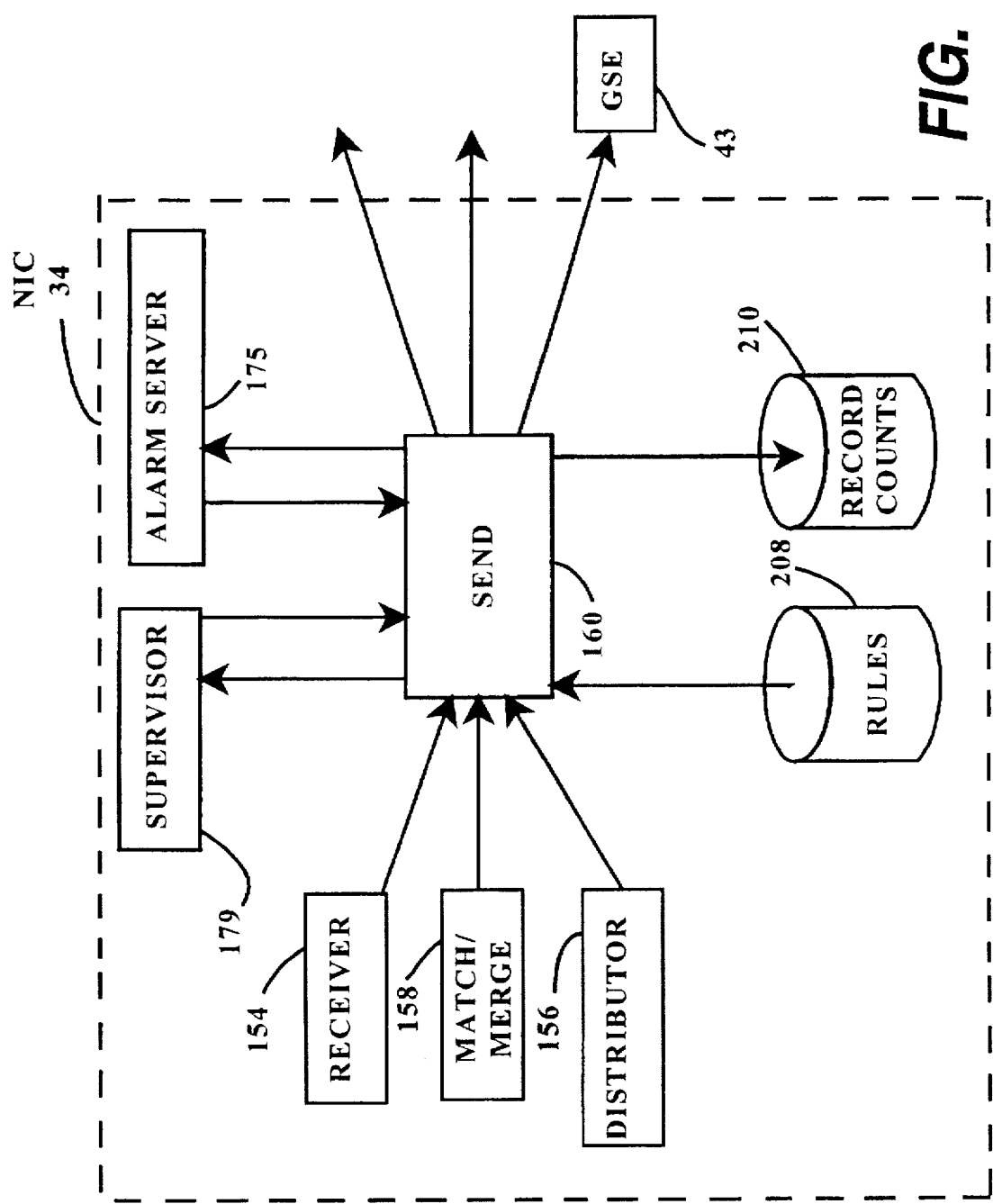
FIG. 14 is a data flow diagram of the Send subsystem.

FIG. 14 is a data flow diagram of the Send subsystem 160. Basically, the Send subsystem performs the converse function of the Receive subsystem. Namely, to transport the output of the NIC to downstream client subsystems. All retransmission rejects from the SAVEs are passed to the Send subsystem by the receiver subsystem. All call records received from the SAVEs and GSE specific call records will be passed to the Send subsystem. Rules governing the Send subsystem are stored on hard disk 208. These rules may pertain to the record count generation time for NIC event records (NERs), the record count generation time for each client, etc.

Various outputs are shown from the Send subsystem 160 in FIG. 14. These include a hard disk 210. The record sent to each client is counted and maintained by the Send subsystem, on the disk. The generalized statistics engine (GSE) receives specific call records from the SAVEs.

Process Flow for the Send Subsystem

Figure 17:
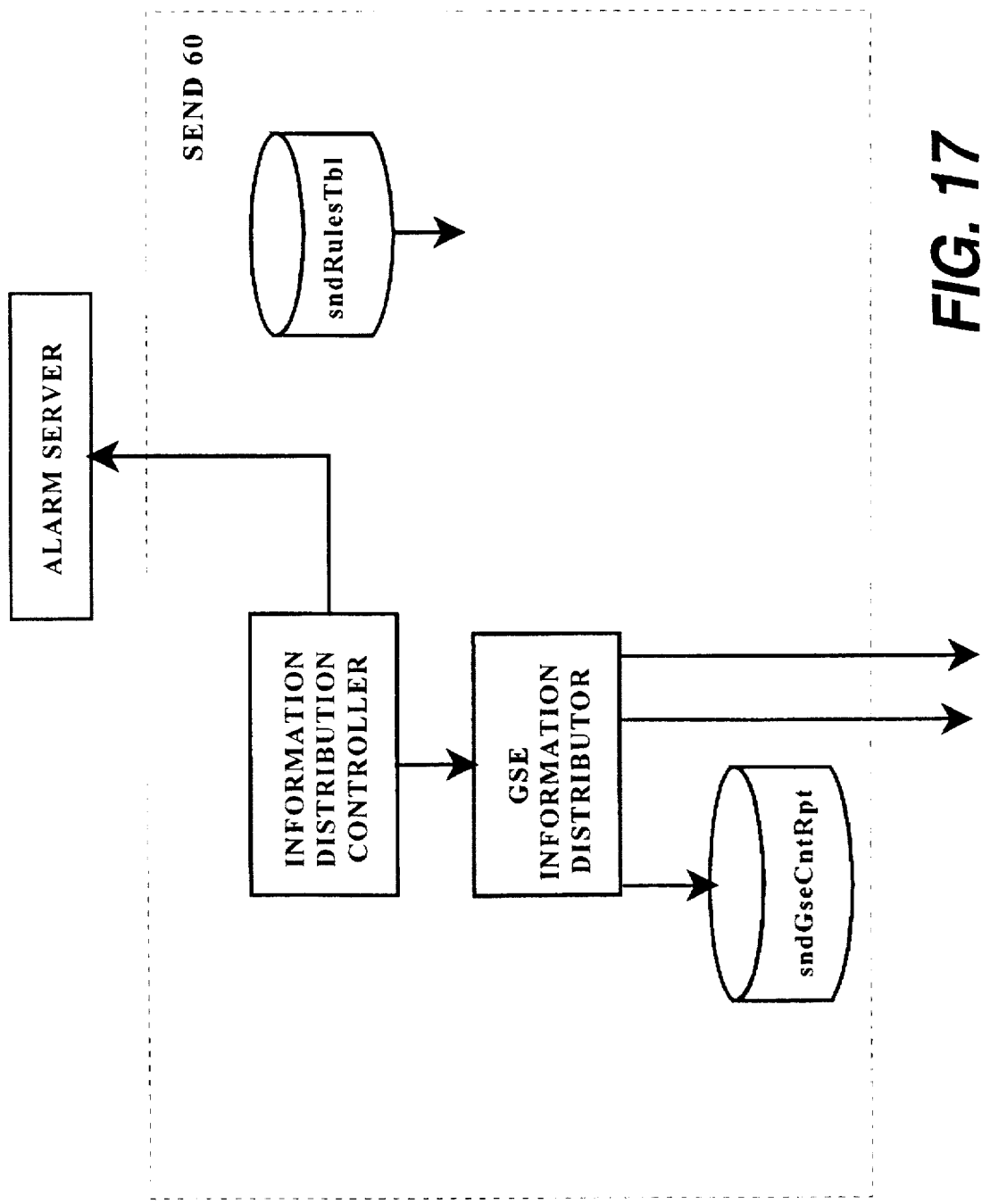
FIG. 17 is a process flow diagram for a send subsystem of the NIC.

In FIG. 17, a process flow diagram for the Send subsystem 160 is illustrated. As indicated, it comprises a number of modules to be discussed as follows.

Figure 18:
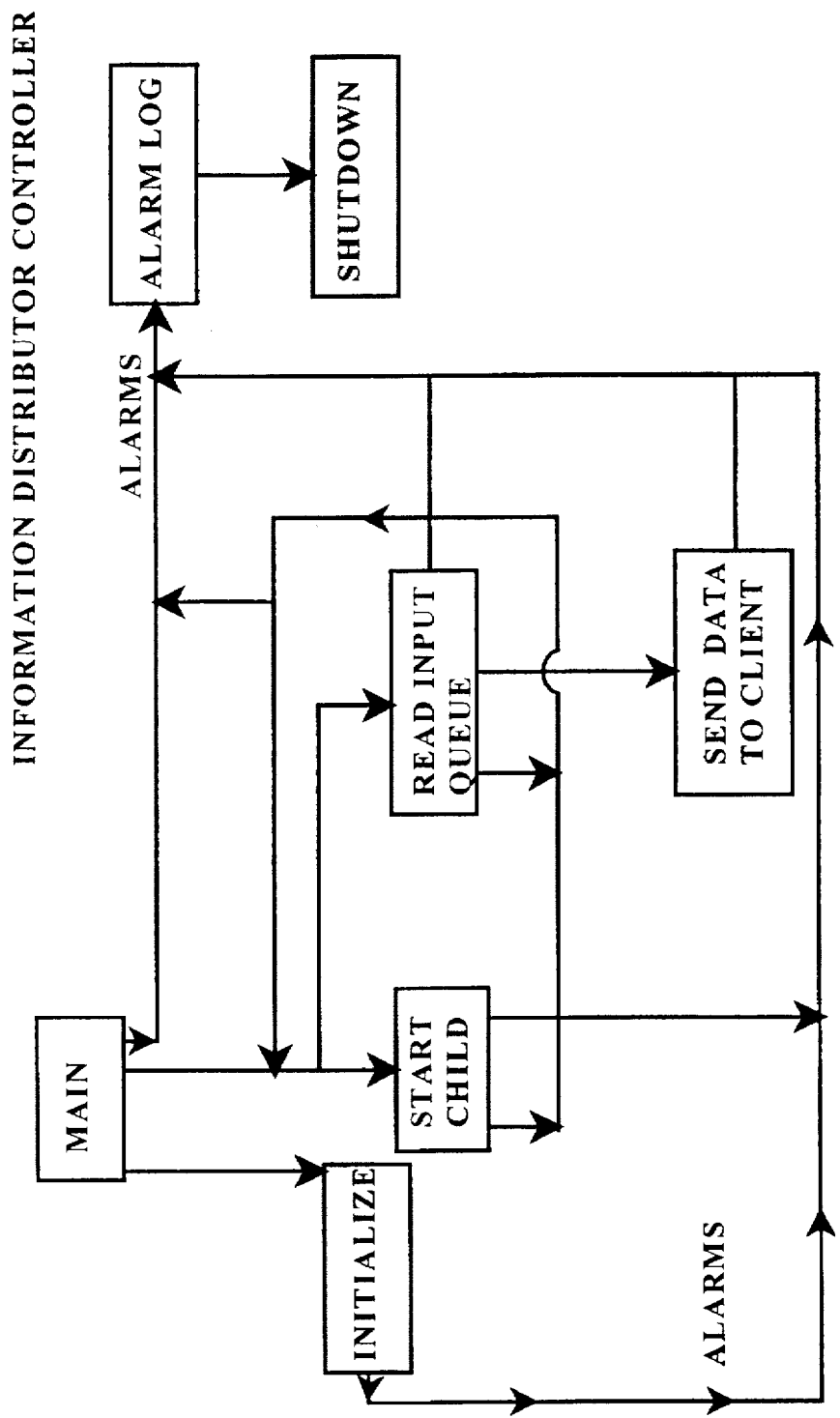
FIG. 18 is a process flow diagram for an information distribution subsystem of the NIC.

The Information Distribution Controller process is responsible for starting and maintaining its child process (Information Distributor). In FIG. 18, the main module will call necessary modules to handle the initialization, signals, and its input queues. After initializing, the main module will forever receive data. The queue input will be handled by calling the Read Input Queue module. The Initialize module will be called by the main module to read all the files, open all the queues, initialize global variables and to create and initialize shared virtual memory. The shared virtual memory will be used to maintain information on the child processes. The read input queue module is called by the main module whenever there is a message on any of its input queues. There are two types of messages: the shutdown message and the client data message. Whenever a shutdown message is received, this module will log the condition and terminate by calling the Log Alarm module. The client data message will be handled by looking at the API to determine the data destination and sending the data to the appropriate Information Distributor process handling the destination connection. This module will also detect any data with multiple destinations and clone as necessary.

The log alarm module is called by all other modules whenever an error condition is detected. This module will log the alarm to the Alarm Server and determine if the error condition is fatal. The Shutdown module will be called for all fatal conditions. The Shutdown module is called by the Log Alarm module whenever a fatal condition is encountered. This module is responsible for cleaning up and terminating the process. A termination includes notifying the child process of the shutdown condition and terminating any child process underway after some rule table determined time. This module will terminate the Information Distribution Controller process after all its child processes (Information Distributor) terminate.

Figure 19:
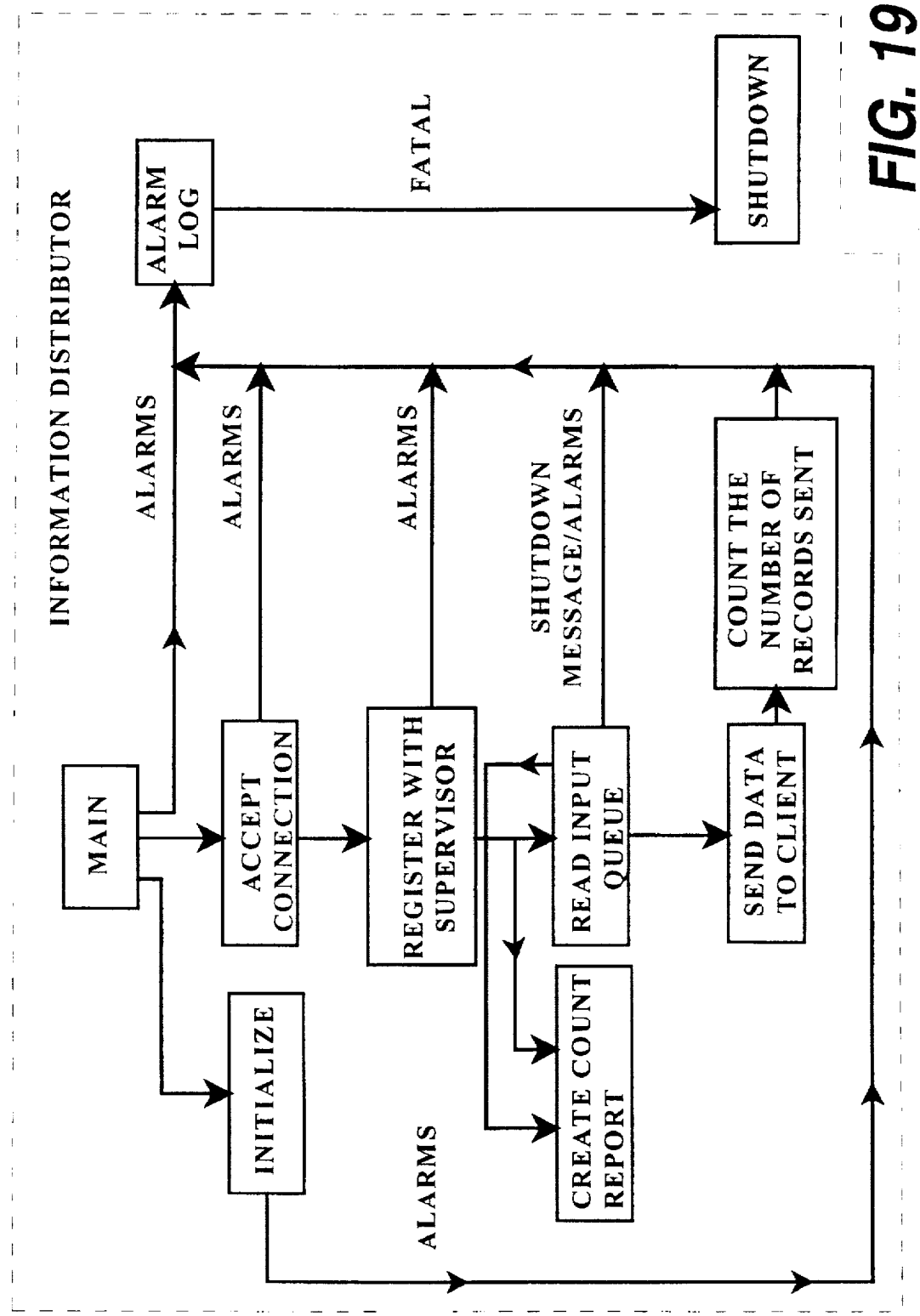
FIG. 19 is a process flow diagram for a more detailed information distribution controlling subsystem.

FIG. 19 illustrates the Information Distributor processes started and terminated by the Information Distribution Controller process. The Information Distributor process handling the GSE connection will transmit a subset of Call Records received from the SAVEs to the GSE. Connections to the GSE will be established and maintained by the client. The connections between the NIC and the clients will be initiated and maintained by the clients. The following discussion highlights the principal modules of FIG. 19.

The main module will call necessary modules to handle the initialization, signals, and its input queues. The main module will call the Accept Connection module to accept the connection from the clients and to send a registration response to a valid registration request message. Once the connection is established, the main module will call the Register with Supervisor module to notify the Supervisor subsystem of the connection success status. After the registration with the Supervisor, the main module will loop forever to handle both the incoming data from the Information Distribution Controller process and the count timer. The Read Input Queue module will be called to handle the incoming data and the Create Count Report module will be called to handle the count timer.

The initialize module will be called by the main module to read all the files, open all the queues, initialize global variables and to create and initialize shared virtual memory. The shared virtual memory is used to keep the number of records sent to the client. The accept connection module will be called by the main module to accept a connection request from a client. Once the connection registration request message is verified, this module will send a registration response to the client to complete the connection. An invalid registration request will invoke "Log Alarm" with a fatal condition set. The register with Supervisor module is called by the main module after the connection to the client is established. This module will send a registration message to the Supervisor to announce the successful connection condition. The information will also contain the client the process is currently serving. The create count report module is called by the main module whenever a count timer expires. This timer indicates a count reporting event. The total number of records sent to the clients are calculated and either sent to the Supervisor or are created into a count report.

The read input queue module is called by the main module whenever there is a message in the input queue. There are two types of inputs: a message to terminate and client data messages. The termination messages are handled by calling the Log Alarm module with a fatal error condition set. The client data messages are sent to the clients by calling the send data to client module.

The send data to client module is called by the Read Input Queue module to handle the client data messages. This module will send the data to the client it is currently serving. If send is successful, the number of records sent will be counted by calling "Count the number of Records sent" module. The count number of records sent module will count the number of records sent to the clients. The Call Records from the SAVEs will be counted on the basis of their switch. The record counts will be stored in the shared virtual memory.

The log alarm module is called by all other modules whenever an error condition is detected. This module will log the alarm to the Alarm Server and determine if the error condition is fatal. The shutdown module will be called for all fatal conditions. The shutdown module is called by the Log Alarm module. This module is responsible for cleaning up and terminating. This module will deregister with the Supervisor before terminating the process.

It should be understood that the invention is not limited to the exact details of construction shown and described herein for obvious modifications will occur to persons skilled in the art.

We claim:

1. In a telephone network, network information architecture interposed between network elements located at inputs of the architecture, and end users at outputs of the architecture, the architecture comprising:

a plurality of storage and verifications elements (SAVEs) for collecting and storing call detail records presented at the inputs;

network information concentration means for providing single point access between the SAVEs and a plurality of downstream application subsystems, the network information concentration means selecting data fields from call detail records supplied by the SAVEs, as required by the subsystems; and means for connecting the application subsystems to end users requiring data from corresponding selected data fields and processed by selected subsystems;

a fiberoptic interface connected between the output of each data access point of a network and a related active input of a SAVE;

each SAVE having a standby input connected to an output of another fiberoptic interface to increase the redundancy of the connection between the fiberoptic interfaces and the data access points.

2. In a telephone network, network information architecture interposed between network elements located at inputs of the architecture, and end users at outputs of the architecture, the architecture comprising:

a plurality of storage and verifications elements (SAVEs) for collecting and storing call detail records presented at the inputs;

network information concentration means for providing single point access between the SAVEs and a plurality of downstream application subsystems, the network information concentration means selecting data fields from call detail records supplied by the SAVEs, as required by the subsystems; and means for connecting the application subsystems to end users requiring data from corresponding selected data fields and processed by selected subsystems;

wherein network elements generate application data field requests to the data access points, requesting routing information for telephone calls, the data access points responding with application data field records, the SAVEs further including— means for storing application data field message pairs (requested responses) received from a data access point;

means for storing call detail records received from network elements;

interface means for providing bi-directional data communication between the network information concentration means and the SAVEs;

inputs of the interface means connected to outputs of the storing means for retrieving application data field message pair and call detail records, when transmission of such records is incomplete, and retransmission is requested by the network information concentrating means;

means connected between the storing means and the interface for validating the correctness of the requested retransmission, thus connecting only validated retransmitted records to the interface means for retransmission to the network information concentration means.

3. In a telephone network, network information architecture interposed between network elements located at inputs of the architecture, and end users at outputs of the architecture, the architecture comprising:

a plurality of storage and verifications elements (SAVEs) for collecting and storing call detail records presented at the inputs;

network information concentration means for providing single point access between the SAVEs and a plurality of downstream application subsystems, the network information concentration means selecting data fields from call detail records supplied by the SAVEs, as required by the subsystems; and means for connecting the application subsystems to end users requiring data from corresponding selected data fields and processed by selected subsystems;

wherein the network elements generate bundled blocks of call detail records and corresponding sequence numbers, the SAVEs receiving the sequence numbers and the blocks for subsequent deblocking;

the sequence numbers of the deblocked data being analyzed by the SAVEs to verify that data is neither duplicated nor missing;

wherein the data is reblocked with new sequence numbers and transmitted to the network information concentration means.

4. In a telephone network, network information architecture interposed between network elements located at inputs of the architecture, and end users at outputs of the architecture, the architecture comprising:

a plurality of storage and verifications elements (SAVEs) for collecting and storing call detail records presented at the inputs:

network information concentration means for providing single point access between the SAVEs and a plurality of downstream application subsystems, the network information concentration means selecting data fields from call detail records supplied by the SAVEs, as required by the subsystems; and means for connecting the application subsystems to end users requiring data from corresponding selected data fields and processed by selected subsystems;

wherein the network information concentration means includes— means for receiving call records from the SAVEs;

distributor means for detecting the type of call record being received;

means for detecting anomalies in the call records being received;

means for generating a request for retransmission of call records, to a respective SAVE, when a missing record is detected;

means for processing the call records in accordance with a selected application; and means for sending processed call records to a downstream user of the processed call records.

5. The network information architecture set forth in claim 4 wherein the processing means, are connected in parallel between the distributor means and the sending means, and further comprises:

a user interface for allowing a downstream user to access raw unprocessed data;

an alarm server for detecting faults occurring in the architecture; and means for matching billing records, related to a particular telephone call, and generated by different network elements.

6. The network information architecture set forth in claim 5 further comprising a generalized statistics engine, connected at an outlet of the network information concentration means, for receiving call records and performing preselected statistical counts thereon.

7. In a telephone network, network information architecture interposed between network elements at inputs of the architecture, and end users at outputs of the architecture, the architecture comprising:

SAVE means for partitioning data received from network elements of the telephone network;

means having an input connected to a plurality of SAVEs for concentrating at a single point, the information derived from the SAVEs, the information concentrating means including—

(a) means for capturing partitioned data from the plurality of SAVEs;

(b) means for correlating the partitioned captured data in real time to ensure that captured data is neither lost or duplicated;

means connected at an output of the concentrating means for interfacing selectable correlated data from the concentrating means to users requesting specific types of data.

8. A method for centralizing phone network event data and processing the data for different results, comprising the steps:

interfacing with the output of a network element for receiving the event data;

storing preselected parts of the data, in the event retransmission thereof becomes necessary;

filtering the data for unwanted parts thereof;

making the filtered data available to downstream users;

matching related events, arriving from different sections of the network and pertaining to the same call;

making the matched data available to downstream users;

creating statistical count data, relating to preselected network occurrences for predetermined types of calls; and making the statistical count data available to downstream users.

* * * * *